(12) United States Patent
Chagam Reddy

(10) Patent No.: US 12,506,817 B2
(45) Date of Patent: Dec. 23, 2025

(54) TECHNOLOGIES FOR ALLOCATING RESOURCES ACROSS DATA CENTERS

(71) Applicant: Intel Corporation, Santa Clara, CA (US)

(72) Inventor: Anjaneya Reddy Chagam Reddy, Chandler, AZ (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 18/238,096

(22) Filed: Aug. 25, 2023

(65) Prior Publication Data

US 2023/0421358 A1    Dec. 28, 2023

Related U.S. Application Data

(63) Continuation of application No. 17/391,549, filed on Aug. 2, 2021, now abandoned, which is a
(Continued)

(30) Foreign Application Priority Data

Aug. 30, 2017  (IN) .............................. 201741030632

(51) Int. Cl.
*H04L 41/0896* (2022.01)
*G06F 3/06* (2006.01)
(Continued)

(52) U.S. Cl.
CPC ............ *H04L 69/18* (2013.01); *G06F 3/0604* (2013.01); *G06F 3/0605* (2013.01);
(Continued)

(58) Field of Classification Search
CPC .... G06F 9/5022; G06F 9/505; G06F 11/3442; H04L 67/1008; H04L 41/0896; H04L 41/5025
See application file for complete search history.

(56) References Cited

U.S. PATENT DOCUMENTS 6,085,295 A   7/2000  Ekanadham et al.
6,104,696 A   8/2000  Kadambi et al.
(Continued)

FOREIGN PATENT DOCUMENTS

CN   1468007       1/2004
CN   1752887 A     3/2006
(Continued)

OTHER PUBLICATIONS

"Directory-Based Cache Coherence," Parallel Computer Architecture and Programming, CMU 15-418/15-618, Spring 2019.
(Continued)

*Primary Examiner* — Jason D Recek
(74) *Attorney, Agent, or Firm* — Essential Patents Group, LLP; Christopher K. Gagne

(57) ABSTRACT

Technologies for allocating resources across data centers include a compute device to obtain resource utilization data indicative of a utilization of resources for a managed node to execute a workload. The compute device is also to determine whether a set of resources presently available to the managed node in a data center in which the compute device is located satisfies the resource utilization data. Additionally, the compute device is to allocate, in response to a determination that the set of resources presently available to the managed node does not satisfy the resource utilization data, a supplemental set of resources to the managed node. The supplemental set of resources are located in an off-premises data center that is different from the data center in which the compute device is located. Other embodiments are also described and claimed.

21 Claims, 21 Drawing Sheets

Related U.S. Application Data continuation of application No. 15/858,286, filed on Dec. 29, 2017, now abandoned.

(60) Provisional application No. 62/584,401, filed on Nov. 10, 2017.

(51) Int. Cl.

| | | |
|---|---|---|
| *G06F 9/28* | (2006.01) | |
| *G06F 9/4401* | (2018.01) | |
| *G06F 9/445* | (2018.01) | |
| *G06F 9/448* | (2018.01) | |
| *G06F 9/50* | (2006.01) | |
| *G06F 11/34* | (2006.01) | |
| *G06F 12/02* | (2006.01) | |
| *G06F 12/06* | (2006.01) | |
| *G06F 12/14* | (2006.01) | |
| *G06F 13/16* | (2006.01) | |
| *G06F 13/40* | (2006.01) | |
| *G06F 13/42* | (2006.01) | |
| *G06F 15/16* | (2006.01) | |
| *G06F 15/173* | (2006.01) | |
| *G06F 15/78* | (2006.01) | |
| *G06F 16/11* | (2019.01) | |
| *G06F 16/22* | (2019.01) | |
| *G06F 16/23* | (2019.01) | |
| *G06F 16/2453* | (2019.01) | |
| *G06F 16/2455* | (2019.01) | |
| *G06F 16/248* | (2019.01) | |
| *G06F 16/25* | (2019.01) | |
| *G06F 16/901* | (2019.01) | |
| *G06F 30/34* | (2020.01) | |
| *G11C 8/12* | (2006.01) | |
| *G11C 29/02* | (2006.01) | |
| *G11C 29/36* | (2006.01) | |
| *G11C 29/38* | (2006.01) | |
| *G11C 29/44* | (2006.01) | |
| *H04L 9/08* | (2006.01) | |
| *H04L 41/0213* | (2022.01) | |
| *H04L 41/0668* | (2022.01) | |
| *H04L 41/0677* | (2022.01) | |
| *H04L 41/0893* | (2022.01) | |
| *H04L 41/5025* | (2022.01) | |
| *H04L 45/28* | (2022.01) | |
| *H04L 45/7453* | (2022.01) | |
| *H04L 47/11* | (2022.01) | |
| *H04L 47/125* | (2022.01) | |
| *H04L 47/83* | (2022.01) | |
| *H04L 49/00* | (2022.01) | |
| *H04L 49/351* | (2022.01) | |
| *H04L 49/9005* | (2022.01) | |
| *H04L 67/1001* | (2022.01) | |
| *H04L 67/1008* | (2022.01) | |
| *H04L 69/12* | (2022.01) | |
| *H04L 69/18* | (2022.01) | |
| *H04L 69/22* | (2022.01) | |
| *H04L 69/32* | (2022.01) | |
| *H05K 7/14* | (2006.01) | |
| *H05K 7/18* | (2006.01) | |
| *H05K 7/20* | (2006.01) | |
| *G06F 9/44* | (2018.01) | |
| *G06F 9/48* | (2006.01) | |
| *G06F 12/0802* | (2016.01) | |
| *G06F 12/1045* | (2016.01) | |
| *G06F 21/10* | (2013.01) | |
| *G06N 3/063* | (2023.01) | |
| *G06Q 10/0631* | (2023.01) | |
| *G06Q 30/0283* | (2023.01) | |
| *H04L 9/40* | (2022.01) | |
| *H04L 41/0895* | (2022.01) | |
| *H04L 41/149* | (2022.01) | |
| *H04L 41/34* | (2022.01) | |
| *H04L 41/40* | (2022.01) | |
| *H04L 41/5019* | (2022.01) | |
| *H04L 43/20* | (2022.01) | |
| *H04L 49/40* | (2022.01) | |
| *H04L 69/321* | (2022.01) | |

(52) U.S. Cl.
CPC .......... *G06F 3/0611* (2013.01); *G06F 3/0613* (2013.01); *G06F 3/0629* (2013.01); *G06F 3/0631* (2013.01); *G06F 3/0632* (2013.01); *G06F 3/0644* (2013.01); *G06F 3/0647* (2013.01); *G06F 3/065* (2013.01); *G06F 3/0659* (2013.01); *G06F 3/067* (2013.01); *G06F 3/0673* (2013.01); *G06F 3/0683* (2013.01); *G06F 3/0685* (2013.01); *G06F 9/28* (2013.01); *G06F 9/4406* (2013.01); *G06F 9/4411* (2013.01); *G06F 9/445* (2013.01); *G06F 9/4494* (2018.02); *G06F 9/5022* (2013.01); *G06F 9/505* (2013.01); *G06F 9/5088* (2013.01); *G06F 11/3442* (2013.01); *G06F 12/023* (2013.01); *G06F 12/06* (2013.01); *G06F 12/0607* (2013.01); *G06F 12/14* (2013.01); *G06F 13/1663* (2013.01); *G06F 13/1668* (2013.01); *G06F 13/4068* (2013.01); *G06F 13/42* (2013.01); *G06F 15/161* (2013.01); *G06F 15/17331* (2013.01); *G06F 15/7867* (2013.01); *G06F 16/119* (2019.01); *G06F 16/221* (2019.01); *G06F 16/2237* (2019.01); *G06F 16/2255* (2019.01); *G06F 16/2282* (2019.01); *G06F 16/2365* (2019.01); *G06F 16/2453* (2019.01); *G06F 16/2455* (2019.01); *G06F 16/24553* (2019.01); *G06F 16/248* (2019.01); *G06F 16/25* (2019.01); *G06F 16/9014* (2019.01); *G06F 30/34* (2020.01); *G11C 8/12* (2013.01); *G11C 29/028* (2013.01); *G11C 29/36* (2013.01); *G11C 29/38* (2013.01); *G11C 29/44* (2013.01); *H04L 9/0819* (2013.01); *H04L 9/0894* (2013.01); *H04L 41/0213* (2013.01); *H04L 41/0668* (2013.01); *H04L 41/0677* (2013.01); *H04L 41/0893* (2013.01); *H04L 41/0896* (2013.01); *H04L 41/5025* (2013.01); *H04L 45/28* (2013.01); *H04L 45/7453* (2013.01); *H04L 47/11* (2013.01); *H04L 47/125* (2013.01); *H04L 47/83* (2022.05); *H04L 49/30* (2013.01); *H04L 49/351* (2013.01); *H04L 49/9005* (2013.01); *H04L 67/1001* (2022.05); *H04L 67/1008* (2013.01); *H04L 69/12* (2013.01); *H04L 69/22* (2013.01); *H04L 69/32* (2013.01); *H05K 7/1489* (2013.01); *H05K 7/18* (2013.01); *H05K 7/20209* (2013.01); *H05K 7/20736* (2013.01); *G06F 9/44* (2013.01); *G06F 9/4401* (2013.01); *G06F 9/4856* (2013.01); *G06F 9/5044* (2013.01); *G06F 9/5055* (2013.01); *G06F 9/5061* (2013.01); *G06F 12/0802* (2013.01); *G06F 12/1054* (2013.01); *G06F 12/1063* (2013.01); *G06F 13/4022* (2013.01); *G06F 15/1735* (2013.01); *G06F 21/105* (2013.01);

G06F 2200/201 (2013.01); G06F 2201/85 (2013.01); G06F 2209/5019 (2013.01); G06F 2209/509 (2013.01); G06F 2212/1044 (2013.01); G06F 2212/1052 (2013.01); G06F 2212/601 (2013.01); G06F 2213/0026 (2013.01); G06F 2213/0064 (2013.01); G06F 2213/3808 (2013.01); G06N 3/063 (2013.01); G06Q 10/0631 (2013.01); G06Q 30/0283 (2013.01); H04L 41/0895 (2022.05); H04L 41/149 (2022.05); H04L 41/34 (2022.05); H04L 41/40 (2022.05); H04L 41/5019 (2013.01); H04L 43/20 (2022.05); H04L 49/40 (2013.01); H04L 63/0428 (2013.01); H04L 69/321 (2013.01); H05K 7/1498 (2013.01)

(56) References Cited

U.S. PATENT DOCUMENTS

| | | | |
|---|---|---|---|
| 6,115,372 A | 9/2000 | Dinha | |
| 6,353,885 B1 | 3/2002 | Herzi et al. | |
| 6,367,018 B1 | 4/2002 | Jain | |
| 6,650,620 B1 | 11/2003 | Neogi | |
| 6,714,549 B1 | 3/2004 | Phaltankar | |
| 7,415,022 B2 | 8/2008 | Kadambi et al. | |
| 7,739,677 B1 | 6/2010 | Kekre et al. | |
| 7,835,388 B2 | 11/2010 | Hu | |
| 7,962,736 B1 | 6/2011 | Polyudov | |
| 8,248,928 B1 | 8/2012 | Wang et al. | |
| 8,566,574 B2 | 10/2013 | Shriver | |
| 8,788,663 B1 | 7/2014 | Adogla et al. | |
| 8,812,765 B2 | 8/2014 | Dai et al. | |
| 9,026,765 B1 | 5/2015 | Marshak et al. | |
| 9,042,402 B1 | 5/2015 | Loganathan et al. | |
| 9,143,406 B2 | 9/2015 | Waggener et al. | |
| 9,253,055 B2 | 2/2016 | Nelke et al. | |
| 9,356,883 B1 * | 5/2016 | Borthakur | H04L 41/5025 |
| 9,612,767 B2 | 4/2017 | Huang et al. | |
| 9,733,980 B1 | 8/2017 | Khan et al. | |
| 9,859,918 B1 | 1/2018 | Gopal | |
| 9,893,988 B2 | 2/2018 | Agarwal et al. | |
| 9,929,747 B2 | 3/2018 | Gopal | |
| 9,936,613 B2 | 4/2018 | Adiletta | |
| 9,954,552 B2 | 4/2018 | Gopal | |
| 9,973,207 B2 | 5/2018 | Gopal | |
| 10,033,404 B2 | 7/2018 | Cutter | |
| 10,034,407 B2 | 7/2018 | Miller | |
| 10,045,098 B2 | 8/2018 | Adiletta | |
| 10,070,207 B2 | 9/2018 | Adiletta et al. | |
| 10,085,358 B2 | 9/2018 | Adiletta | |
| 10,091,904 B2 | 10/2018 | Miller | |
| 10,116,327 B2 | 10/2018 | Cutter | |
| 10,154,023 B1 | 12/2018 | Nossik et al. | |
| 10,191,684 B2 | 1/2019 | Gopal et al. | |
| 10,234,833 B2 | 3/2019 | Ahuja | |
| 10,263,637 B2 | 4/2019 | Gopal | |
| 10,268,412 B2 | 4/2019 | Guilford | |
| 10,313,769 B2 | 6/2019 | Miller | |
| 10,334,334 B2 | 6/2019 | Miller | |
| 10,339,317 B2 | 7/2019 | Raghuram et al. | |
| 10,348,327 B2 | 7/2019 | Adiletta | |
| 10,349,152 B2 | 7/2019 | Adiletta | |
| 10,356,495 B2 | 7/2019 | Adiletta | |
| 10,368,148 B2 | 7/2019 | Kumar | |
| 10,390,114 B2 | 8/2019 | Schmisseur | |
| 10,397,670 B2 | 8/2019 | Gorius | |
| 10,411,729 B2 | 9/2019 | Miller | |
| 10,448,126 B2 | 10/2019 | Gilsdorf | |
| 10,461,774 B2 | 10/2019 | Balle | |
| 10,469,252 B2 | 11/2019 | Schmisseur | |
| 10,474,460 B2 | 11/2019 | Adiletta | |
| 10,476,670 B2 | 11/2019 | Schmisseur | |
| 10,489,156 B2 | 11/2019 | Munoz | |
| 10,542,333 B2 | 1/2020 | Miller | |
| 10,963,176 B2 | 3/2021 | Balle et al. | |
| 10,990,309 B2 | 4/2021 | Bernat et al. | |
| 11,029,870 B2 | 6/2021 | Balle et al. | |
| 11,128,553 B2 | 9/2021 | Adiletta et al. | |
| 11,507,430 B2 | 11/2022 | Subramanian et al. | |
| 11,630,702 B2 | 4/2023 | Kumar et al. | |
| 11,977,923 B2 | 5/2024 | Kumar et al. | |
| 2003/0026525 A1 | 2/2003 | Alvarez | |
| 2003/0028594 A1 | 2/2003 | Laschkewitsch et al. | |
| 2004/0205304 A1 | 10/2004 | McKenney et al. | |
| 2005/0135231 A1 | 6/2005 | Bellovin | |
| 2006/0036719 A1 | 2/2006 | Bodin et al. | |
| 2006/0059492 A1 | 3/2006 | Fellenstein et al. | |
| 2006/0064752 A1 | 3/2006 | Wang et al. | |
| 2006/0161750 A1 | 7/2006 | Perkins et al. | |
| 2006/0168337 A1 | 7/2006 | Stahl et al. | |
| 2006/0184670 A1 | 8/2006 | Beeson et al. | |
| 2006/0239270 A1 | 10/2006 | Yao et al. | |
| 2007/0147400 A1 | 6/2007 | Hu | |
| 2007/0180515 A1 | 8/2007 | Danilak | |
| 2007/0226424 A1 | 9/2007 | Clark et al. | |
| 2008/0075071 A1 | 3/2008 | Beshai | |
| 2008/0077993 A1 | 3/2008 | Zimmer et al. | |
| 2008/0229318 A1 | 9/2008 | Franke | |
| 2009/0013166 A1 | 1/2009 | Crowder, Jr. et al. | |
| 2009/0164994 A1 | 6/2009 | Vasilevsky et al. | |
| 2009/0172377 A1 | 7/2009 | Gueron et al. | |
| 2009/0198792 A1 | 8/2009 | Wittenschlaeger | |
| 2009/0327741 A1 | 12/2009 | Zimmer et al. | |
| 2010/0064295 A1 | 3/2010 | Aho et al. | |
| 2010/0111309 A1 | 5/2010 | Khatri et al. | |
| 2010/0169640 A1 | 7/2010 | Smith et al. | |
| 2010/0191823 A1 | 7/2010 | Archer et al. | |
| 2011/0185125 A1 | 7/2011 | Jain et al. | |
| 2011/0228767 A1 | 9/2011 | Singla et al. | |
| 2011/0264925 A1 | 10/2011 | Russo et al. | |
| 2011/0296231 A1 | 12/2011 | Dake | |
| 2011/0320804 A1 | 12/2011 | Chan et al. | |
| 2011/0320823 A1 | 12/2011 | Saroiu et al. | |
| 2012/0054770 A1 | 3/2012 | Krishnamurthy et al. | |
| 2012/0072481 A1 | 3/2012 | Nandlall et al. | |
| 2012/0099863 A1 | 4/2012 | Xu et al. | |
| 2012/0207139 A1 | 8/2012 | Husted et al. | |
| 2012/0230343 A1 | 9/2012 | Schrum, Jr. | |
| 2012/0254602 A1 | 10/2012 | Bhansali et al. | |
| 2012/0303885 A1 | 11/2012 | Jeddeloh | |
| 2013/0054948 A1 | 2/2013 | Raj et al. | |
| 2013/0067245 A1 | 3/2013 | Horovitz et al. | |
| 2013/0159638 A1 | 6/2013 | Koinuma et al. | |
| 2013/0179485 A1 | 7/2013 | Chapman et al. | |
| 2013/0232495 A1 | 9/2013 | Rossbach et al. | |
| 2013/0297769 A1 | 11/2013 | Chang et al. | |
| 2013/0325998 A1 | 12/2013 | Hormuth et al. | |
| 2013/0345530 A1 | 12/2013 | McRoberts et al. | |
| 2014/0012961 A1 | 1/2014 | Pope | |
| 2014/0013327 A1 | 1/2014 | Sherwood et al. | |
| 2014/0047272 A1 | 2/2014 | Breternitz et al. | |
| 2014/0047341 A1 | 2/2014 | Breternitz et al. | |
| 2014/0064149 A1 | 3/2014 | Frey | |
| 2014/0079221 A1 | 3/2014 | McCallum et al. | |
| 2014/0089650 A1 | 3/2014 | Polzin et al. | |
| 2014/0089654 A1 | 3/2014 | Lerner et al. | |
| 2014/0089712 A1 | 3/2014 | Machnicki et al. | |
| 2014/0095691 A1 * | 4/2014 | Ganguli | H04L 41/5009 709/224 |
| 2014/0230078 A1 | 8/2014 | Graham | |
| 2014/0359044 A1 | 12/2014 | Davis et al. | |
| 2015/0007182 A1 | 1/2015 | Rossbach et al. | |
| 2015/0074425 A1 | 3/2015 | Griffes et al. | |
| 2015/0106804 A1 | 4/2015 | Chandrashekhar et al. | |
| 2015/0149640 A1 | 5/2015 | Douglas et al. | |
| 2015/0195372 A1 | 7/2015 | Zheng | |
| 2015/0227397 A1 | 8/2015 | Gogula et al. | |
| 2015/0229529 A1 | 8/2015 | Engebretsen | |
| 2015/0256476 A1 | 9/2015 | Kurtzman et al. | |
| 2015/0281065 A1 | 10/2015 | Liljenstolpe | |
| 2015/0317176 A1 | 11/2015 | Hussain et al. | |
| 2015/0333824 A1 | 11/2015 | Swinkels et al. | |
| 2015/0334867 A1 | 11/2015 | Faw et al. | |
| 2015/0338426 A1 | 12/2015 | Roese et al. | |
| 2016/0050194 A1 | 2/2016 | Rachmiel | |

(56) References Cited

U.S. PATENT DOCUMENTS

| | | |
|---|---|---|
| 2016/0087847 A1 | 3/2016 | Krithivas et al. |
| 2016/0088578 A1 | 3/2016 | Das et al. |
| 2016/0118121 A1 | 4/2016 | Kelly et al. |
| 2016/0127191 A1 | 5/2016 | Nair |
| 2016/0147592 A1 | 5/2016 | Guddeti |
| 2016/0162281 A1 | 6/2016 | Hokiyama |
| 2016/0164739 A1 | 6/2016 | Skalecki |
| 2016/0231939 A1 | 8/2016 | Cannata et al. |
| 2016/0234580 A1 | 8/2016 | Clarke et al. |
| 2016/0301624 A1 | 10/2016 | Gonzalez et al. |
| 2016/0306663 A1 | 10/2016 | Chang et al. |
| 2016/0306677 A1 | 10/2016 | Hira et al. |
| 2017/0019302 A1 | 1/2017 | Lapiotis et al. |
| 2017/0046179 A1 | 2/2017 | Teh et al. |
| 2017/0070431 A1 | 3/2017 | Nidumolu et al. |
| 2017/0076195 A1 | 3/2017 | Yang et al. |
| 2017/0093756 A1 | 3/2017 | Bernat et al. |
| 2017/0109205 A1* | 4/2017 | Ahuja .................. G06F 9/5094 |
| 2017/0116004 A1 | 4/2017 | Devegowda et al. |
| 2017/0124329 A1 | 5/2017 | Ghafoor et al. |
| 2017/0140151 A1 | 5/2017 | Nelson et al. |
| 2017/0150621 A1 | 5/2017 | Breakstone et al. |
| 2017/0177873 A1 | 6/2017 | Raghuram et al. |
| 2017/0185786 A1 | 6/2017 | Ylinen et al. |
| 2017/0199746 A1 | 7/2017 | Nguyen et al. |
| 2017/0223436 A1 | 8/2017 | Moynihan et al. |
| 2017/0251077 A1 | 8/2017 | Eerpini et al. |
| 2017/0257970 A1 | 9/2017 | Alleman et al. |
| 2017/0264493 A1* | 9/2017 | Cencini .................. H04L 67/12 |
| 2017/0279705 A1 | 9/2017 | Lin et al. |
| 2017/0315798 A1 | 11/2017 | Shivanna et al. |
| 2017/0317945 A1 | 11/2017 | Guo et al. |
| 2017/0329860 A1 | 11/2017 | Jones |
| 2018/0004835 A1 | 1/2018 | Piechowicz et al. |
| 2018/0014306 A1 | 1/2018 | Adiletta |
| 2018/0014757 A1 | 1/2018 | Kumar |
| 2018/0017700 A1 | 1/2018 | Adiletta |
| 2018/0020054 A1 | 1/2018 | Woodcare et al. |
| 2018/0024578 A1 | 1/2018 | Ahuja |
| 2018/0024739 A1 | 1/2018 | Schmisseur |
| 2018/0024740 A1 | 1/2018 | Miller |
| 2018/0024752 A1 | 1/2018 | Miller |
| 2018/0024756 A1 | 1/2018 | Miller |
| 2018/0024764 A1 | 1/2018 | Miller |
| 2018/0024771 A1 | 1/2018 | Miller |
| 2018/0024775 A1 | 1/2018 | Miller |
| 2018/0024776 A1 | 1/2018 | Miller |
| 2018/0024838 A1 | 1/2018 | Nachimuthu |
| 2018/0024860 A1 | 1/2018 | Balle |
| 2018/0024861 A1 | 1/2018 | Balle |
| 2018/0024864 A1 | 1/2018 | Wilde |
| 2018/0024867 A1 | 1/2018 | Gilsdorf |
| 2018/0024932 A1 | 1/2018 | Nachimuthu et al. |
| 2018/0024947 A1 | 1/2018 | Miller |
| 2018/0024957 A1 | 1/2018 | Nachimuthu |
| 2018/0024958 A1 | 1/2018 | Nachimuthu |
| 2018/0024960 A1 | 1/2018 | Wagh |
| 2018/0025299 A1 | 1/2018 | Kumar |
| 2018/0026652 A1 | 1/2018 | Cutter |
| 2018/0026653 A1 | 1/2018 | Cutter |
| 2018/0026654 A1 | 1/2018 | Gopal |
| 2018/0026655 A1 | 1/2018 | Gopal |
| 2018/0026656 A1 | 1/2018 | Gopal |
| 2018/0026800 A1 | 1/2018 | Munoz |
| 2018/0026835 A1 | 1/2018 | Nachimuthu |
| 2018/0026849 A1 | 1/2018 | Guim |
| 2018/0026851 A1 | 1/2018 | Adiletta |
| 2018/0026868 A1 | 1/2018 | Guim |
| 2018/0026882 A1 | 1/2018 | Gorius |
| 2018/0026904 A1 | 1/2018 | Van De Groenendaal |
| 2018/0026905 A1 | 1/2018 | Balle et al. |
| 2018/0026906 A1 | 1/2018 | Balle |
| 2018/0026907 A1 | 1/2018 | Miller |
| 2018/0026908 A1 | 1/2018 | Nachimuthu |
| 2018/0026910 A1 | 1/2018 | Balle et al. |
| 2018/0026912 A1 | 1/2018 | Guim |
| 2018/0026913 A1 | 1/2018 | Balle |
| 2018/0026918 A1 | 1/2018 | Kumar |
| 2018/0027055 A1 | 1/2018 | Balle et al. |
| 2018/0027057 A1 | 1/2018 | Balle |
| 2018/0027058 A1 | 1/2018 | Balle et al. |
| 2018/0027059 A1 | 1/2018 | Miller |
| 2018/0027060 A1* | 1/2018 | Metsch .................. G06F 9/544 |
| 2018/0027062 A1 | 1/2018 | Bernat |
| 2018/0027063 A1 | 1/2018 | Nachimuthu |
| 2018/0027066 A1 | 1/2018 | Van De Groenendaal et al. |
| 2018/0027067 A1 | 1/2018 | Guim |
| 2018/0027093 A1 | 1/2018 | Guim |
| 2018/0027312 A1 | 1/2018 | Adiletta |
| 2018/0027313 A1 | 1/2018 | Adiletta |
| 2018/0027376 A1 | 1/2018 | Kumar |
| 2018/0027679 A1 | 1/2018 | Schmisseur |
| 2018/0027680 A1 | 1/2018 | Kumar |
| 2018/0027682 A1 | 1/2018 | Adiletta |
| 2018/0027684 A1 | 1/2018 | Miller |
| 2018/0027685 A1 | 1/2018 | Miller |
| 2018/0027686 A1 | 1/2018 | Adiletta |
| 2018/0027687 A1 | 1/2018 | Adiletta |
| 2018/0027688 A1 | 1/2018 | Adiletta |
| 2018/0027703 A1 | 1/2018 | Adiletta |
| 2018/0032982 A1 | 2/2018 | Takeuchi |
| 2018/0052709 A1 | 2/2018 | Fong et al. |
| 2018/0067857 A1 | 3/2018 | Wang et al. |
| 2018/0077235 A1 | 3/2018 | Nachimuthu et al. |
| 2018/0150240 A1 | 5/2018 | Bernat et al. |
| 2018/0150256 A1 | 5/2018 | Kumar |
| 2018/0150293 A1 | 5/2018 | Nachimuthu |
| 2018/0150298 A1 | 5/2018 | Balle |
| 2018/0150299 A1 | 5/2018 | Balle |
| 2018/0150330 A1 | 5/2018 | Bernat |
| 2018/0150334 A1 | 5/2018 | Bernat et al. |
| 2018/0150343 A1 | 5/2018 | Bernat |
| 2018/0150372 A1 | 5/2018 | Nachimuthu |
| 2018/0150391 A1 | 5/2018 | Mitchel |
| 2018/0150419 A1 | 5/2018 | Steinmacher-Burow |
| 2018/0150471 A1 | 5/2018 | Gopal |
| 2018/0150644 A1 | 5/2018 | Khanna |
| 2018/0151975 A1 | 5/2018 | Aoki |
| 2018/0152200 A1 | 5/2018 | Guilford |
| 2018/0152201 A1 | 5/2018 | Gopal |
| 2018/0152202 A1 | 5/2018 | Gopal |
| 2018/0152317 A1 | 5/2018 | Chang |
| 2018/0152366 A1 | 5/2018 | Cornett |
| 2018/0152383 A1 | 5/2018 | Burres |
| 2018/0152540 A1 | 5/2018 | Niell |
| 2018/0165199 A1 | 6/2018 | Brandt et al. |
| 2018/0205392 A1 | 7/2018 | Gopal |
| 2018/0266510 A1 | 9/2018 | Jee |
| 2018/0293493 A1 | 10/2018 | Kalamkar et al. |
| 2019/0014396 A1 | 1/2019 | Adiletta |
| 2019/0021182 A1 | 1/2019 | Adiletta |
| 2019/0034102 A1 | 1/2019 | Miller |
| 2019/0034383 A1 | 1/2019 | Schmisseur |
| 2019/0034490 A1 | 1/2019 | Yap |
| 2019/0035483 A1 | 1/2019 | Schmisseur |
| 2019/0042090 A1 | 2/2019 | Raghunath |
| 2019/0042091 A1 | 2/2019 | Raghunath |
| 2019/0042122 A1 | 2/2019 | Schmisseur |
| 2019/0042126 A1 | 2/2019 | Sen |
| 2019/0042136 A1 | 2/2019 | Nachimuthu |
| 2019/0042234 A1 | 2/2019 | Bernat |
| 2019/0042277 A1 | 2/2019 | Nachimuthu |
| 2019/0042408 A1 | 2/2019 | Schmisseur |
| 2019/0042611 A1 | 2/2019 | Yap |
| 2019/0044809 A1 | 2/2019 | Willis |
| 2019/0044849 A1 | 2/2019 | Ganguli |
| 2019/0044859 A1 | 2/2019 | Sundar |
| 2019/0052457 A1 | 2/2019 | Connor |
| 2019/0062053 A1 | 2/2019 | Jensen |
| 2019/0065083 A1 | 2/2019 | Sen |
| 2019/0065112 A1 | 2/2019 | Schmisseur |
| 2019/0065172 A1 | 2/2019 | Nachimuthu |
| 2019/0065212 A1 | 2/2019 | Kumar |
| 2019/0065231 A1 | 2/2019 | Schmisseur |

(56) References Cited

U.S. PATENT DOCUMENTS

| | | |
|---|---|---|
| 2019/0065253 A1 | 2/2019 | Bernat |
| 2019/0065260 A1 | 2/2019 | Balle |
| 2019/0065261 A1 | 2/2019 | Narayan |
| 2019/0065281 A1 | 2/2019 | Bernat et al. |
| 2019/0065290 A1 | 2/2019 | Custodio |
| 2019/0065401 A1 | 2/2019 | Dormitzer |
| 2019/0065415 A1 | 2/2019 | Nachimuthu |
| 2019/0067848 A1 | 2/2019 | Aoki |
| 2019/0068444 A1 | 2/2019 | Grecco |
| 2019/0068464 A1 | 2/2019 | Bernat |
| 2019/0068466 A1 | 2/2019 | Chagam |
| 2019/0068509 A1 | 2/2019 | Hyatt et al. |
| 2019/0068521 A1 | 2/2019 | Kumar |
| 2019/0068523 A1 | 2/2019 | Chagam |
| 2019/0068693 A1 | 2/2019 | Bernat |
| 2019/0068696 A1 | 2/2019 | Sen |
| 2019/0068698 A1 | 2/2019 | Kumar |
| 2019/0069433 A1 | 2/2019 | Balle |
| 2019/0069434 A1 | 2/2019 | Aoki |
| 2019/0129874 A1 | 5/2019 | Huang et al. |
| 2019/0196824 A1 | 6/2019 | Liu |
| 2019/0205745 A1 | 7/2019 | Sridharan et al. |
| 2019/0307014 A1 | 10/2019 | Adiletta |
| 2019/0342642 A1 | 11/2019 | Adiletta |
| 2019/0342643 A1 | 11/2019 | Adiletta |
| 2019/0387291 A1 | 12/2019 | Adiletta |
| 2020/0007511 A1 | 1/2020 | Van De et al. |
| 2020/0226027 A1 | 7/2020 | Krasner et al. |
| 2020/0241926 A1 | 7/2020 | Guim |
| 2020/0341810 A1 | 10/2020 | Ranganathan et al. |
| 2021/0103544 A1 | 4/2021 | Guim Bernat et al. |
| 2021/0209035 A1 | 7/2021 | Galbi et al. |
| 2021/0377140 A1 | 12/2021 | Adiletta |

FOREIGN PATENT DOCUMENTS

| | | |
|---|---|---|
| CN | 1816003 | 8/2006 |
| CN | 101154256 B | 8/2012 |
| CN | 103634330 | 3/2014 |
| CN | 104982005 A | 10/2015 |
| CN | 105183561 | 12/2015 |
| CN | 105721358 | 6/2016 |
| CN | 105979007 | 9/2016 |
| DE | 112015006944 | 3/2023 |
| JP | 2002158733 | 5/2002 |
| KR | 101570773 B1 | 11/2015 |
| WO | 2017052575 | 3/2017 |
| WO | 2017105733 A1 | 6/2017 |
| WO | 2018102414 | 6/2018 |
| WO | 2018111228 | 6/2018 |
| WO | 2020190801 A1 | 9/2020 |

OTHER PUBLICATIONS

"Network Functions Virtualisation (NFV); Architectural Framework," ETSI GS NFV 002, V1.2.1, Dec. 2014, 21 pages.
"Secure In-Field Firmware Updates for MSP MCUs," Texas Instruments, Application Report, Nov. 2015.
Artail, et al., "Speedy Cloud: Cloud Computing with Support for Hardware Acceleration Services," 2017 IEEE, pp. 850-865.
Asiatici, et al., "Virtualized Execution Runtime for FPGA Accelerators in the Cloud," 2017 IEEE, pp. 1900-1910.
Burdeniuk, et al., "An Event-Assisted Sequencer to Accelerate Matrix Algorithms," 2010 IEEE, pp. 158-163.
Caulfield, et al., "A Cloud-scale acceleration Architecture," Microsoft Corp., Oct. 2016, 13 pages.
Communication pursuant to Article 94(3) for European Patent Application No. 18191345.0, dated Apr. 16, 2021.
Corrected Notice of Allowability for U.S. Appl. No. 17/015,479, dated Jun. 3, 2021.
Denneman, Frank, "Numa Deep Dive Part 3: Cache Coherency," https://frankdenneman.nl/2016/07/11/numa-deep-dive-part-3-cache-coherency/, Jul. 11, 2016.
Diamantopoulos, et al., "High-level Synthesizable Dataflow MapReduce Accelerator for FPGA-coupled Data Centers," 2015 IEEE, pp. 26-33.
Ding, et al., "A Unified OpenCL-flavor Programming Model with Scalable Hybrid Hardware Platform on FPGAs," 2014 IEEE, 7 pages.
Extended European Search Report for European Patent Application No. 181934.0, dated Feb. 11, 2019.
Extended European Search Report for European Patent Application No. 20217841.4, dated Apr. 16, 2021.
Fahmy Suhaib, et al., "Virtualized FPGA Accelerators for Efficient Cloud Computing," 2015 IEEE 7th International Conference on Cloud Computing Technology and Science (Cloudcom), IEEE, Nov. 30, 2015, pp. 430-435.
Fahmy, et al., "Virtualized FPGA Accelerators for Efficient Cloud Computing," IEEE, pp. 430-435, 2015.
Final Office Action for U.S. Appl. No. 15/060,844, dated Nov. 21, 2018, 7 pages.
Final Office Action for U.S. Appl. No. 15/719,770, dated Jun. 24, 2020.
Final Office Action from U.S. Appl. No. 17/125,420 notified Oct. 13, 2023, 19 pgs.
Final Office Action from U.S. Appl. No. 17/221,541 notified Jan. 17, 2024, 21 pgs.
Gorman, Mel, et al., "Optimizing Linux for AMD EPYC 7002 Series Processors with SUSE Linux Enterprise 15 SP1," SUSE Best Practices, Nov. 2019.
International Preliminary Report on Patentability for PCT Application No. PCT/US2016/062139, dated Jun. 28, 2018.
International Preliminary Report on Patentability for PCT Application No. PCT/US2017/038552, mailed Jan. 22, 2019.
International Preliminary Report on Patentability for PCT Application No. PCT/US2017/063765, dated Jun. 4, 2019.
International Search Report and Written Opinion for PCT Application No. PCT/US2017/038552, dated Oct. 11, 2017, 3 pages.
International Search Report and Written Opinion for PCT Application No. PCT/US2017/063756, dated Feb. 23, 2018.
International Search Report and Written Opinion for PCT Application No. PCT/US2021/051801, dated Jan. 3, 2022.
International Search Report and Written Opinion issued in PCT Application No. PCT/US2016/062139, dated Feb. 23, 2017, 13 pages.
Non-Final Office Action from U.S. Appl. No. 17/221,541 notified Aug. 1, 2023, 15 pgs.
Non-Final Office Action from U.S. Appl. No. 17/681,025 notified Jun. 23, 2023, 8 pgs.
Non-Final Office Action from U.S. Appl. No. 18/076,104 notified Dec. 12, 2023, 11 pgs.
Non-Final Office Action from U.S. Appl. No. 18/103,739 notified Jun. 29, 2023, 11 pgs.
Non-Final Office Action from U.S. Appl. No. 18/116,957 notified Jun. 30, 2023, 27 pgs.
Non-Published commonly owned U.S. Appl. No. 17/221,541, filed Apr. 2, 2021, 60 pages, Intel Corporation.
Non-Published commonly owned U.S. Appl. No. 17/214,605, filed Mar. 26, 2021, 75 pages, Intel Corporation.
Notice of Allowance for Chinese Patent Application No. 201680067500.4, dated Apr. 6, 2022.
Notice of Allowance for Chinese Patent Application No. 20170038785.3, dated Jul. 13, 2022.
Notice of Allowance for U.S. Appl. No. 15/060,844, dated Mar. 6, 2019, 5 pages.
Notice of Allowance for U.S. Appl. No. 15/395,203, dated Apr. 10, 2018.
Notice of Allowance for U.S. Appl. No. 15/719,770, dated Jun. 17, 2021.
Notice of Allowance for U.S. Appl. No. 15/719,770, dated Mar. 1, 2021.
Notice of Allowance for U.S. Appl. No. 15/721,829, dated Jan. 22, 2021.
Notice of Allowance for U.S. Appl. No. 15/721,829, dated Sep. 11, 2020.

(56) References Cited

OTHER PUBLICATIONS

Notice of Allowance for U.S. Appl. No. 16/055,602, dated Feb. 13, 2020.
Notice of Allowance for U.S. Appl. No. 16/055,602, dated Oct. 28, 2019.
Notice of Allowance for U.S. Appl. No. 16/344,582, dated Jan. 12, 2021.
Notice of Allowance for U.S. Appl. No. 16/433,709, dated Nov. 23, 2022.
Notice of Allowance for U.S. Appl. No. 16/513,345, dated Jun. 5, 2020.
Notice of Allowance for U.S. Appl. No. 16/513,345, dated May 19, 2020.
Notice of Allowance for U.S. Appl. No. 16/513,371, dated Jan. 31, 2020.
Shade, L.K., "Implementing Secure Remote Firmware Updates," Embedded Systems Conference Silicon Valley, 2011, May 2011.
Summons to attend oral proceedings pursuant to Rule 115(1) for European Patent Application No. 18191345.0, dated Aug. 23, 2022.
Translation of Office Action and Search Report for Chinese Patent Application No. 201780038785.3, dated Feb. 18, 2022.
Non-Final Office Action from U.S. Appl. No. 18/238,096 notified Sep. 26, 2024, 12 pgs.
Non-Final Office Action from U.S. Appl. No. 18/405,679 notified Sep. 10, 2024, 31 pgs.
Notice of Allowance for U.S. Appl. No. 16/513,371, dated Jun. 5, 2020.
Notice of Allowance for U.S. Appl. No. 16/513,371, dated May 20, 2020.
Notice of Allowance for U.S. Appl. No. 17/015,479, dated May 26, 2021.
Notice of Allowance for U.S. Appl. No. 17/246,388, dated Dec. 13, 2022.
Notice of Allowance for U.S. Appl. No. 17/404,749, dated Nov. 9, 2022.
Notice of Allowance from Chinese Patent Application No. 201811004538.4 notified Aug. 12, 2024, 7 pgs.
Notice of Allowance from Chinese Patent Application No. 202110060921.7 notified Feb. 23, 2024, 8 pgs.
Notice of Allowance from U.S. Appl. No. 15/942,101 notified Apr. 12, 2022, 14 pgs.
Notice of Allowance from U.S. Appl. No. 17/125,420 notified Jan. 10, 2024, 14 pgs.
Notice of Allowance from U.S. Appl. No. 17/496,146 notified Apr. 28, 2023, 15 pgs.
Notice of Allowance from U.S. Appl. No. 17/681,025 notified Oct. 17, 2023, 14 pgs.
Notice of Allowance from U.S. Appl. No. 17/871,429 notified Sep. 18, 2023, 7 pgs.
Notice of Allowance from U.S. Appl. No. 18/076,104 notified Mar. 26, 2024, 12 pgs.
Notice of Allowance from U.S. Appl. No. 18/103,739 notified Jan. 18, 2024, 12 pgs.
Notice of Allowance from U.S. Appl. No. 18/116,957 notified Jan. 19, 2024, 12 pgs.
Notice of Allowance from U.S. Appl. No. 18/116,957 notified May 1, 2024, 14 pgs.
Notice of Allowance from U.S. Appl. No. 18/223,399 notified Jul. 31, 2024, 5 pgs.
Office Action for U.S. Appl. No. 15/396,014 dated Nov. 4, 2019.
Office Action for U.S. Appl. No. 15/060,844, dated Apr. 25, 2018, 6 pages.
Office Action for U.S. Appl. No. 15/060,844, dated Sep. 8, 2017, 11 pages.
Office Action for U.S. Appl. No. 15/395,203, dated Dec. 1, 2017.
Office Action for U.S. Appl. No. 15/396,014, dated May 10, 2022.
Office Action for U.S. Appl. No. 15/396,014, dated May 14, 2020.
Office Action for U.S. Appl. No. 15/396,014, dated Nov. 3, 2022.
Office Action for U.S. Appl. No. 15/719,770, dated Dec. 27, 2019.
Office Action for U.S. Appl. No. 15/721,829 dated Dec. 23, 2019.
Office Action for U.S. Appl. No. 15/721,829, dated May 13, 2020.
Office Action for U.S. Appl. No. 16/055,602 dated Mar. 27, 2019.
Office Action for U.S. Appl. No. 16/055,602, dated Aug. 15, 2019.
Office Action for U.S. Appl. No. 16/344,582, dated Jul. 22, 2020.
Office Action for U.S. Appl. No. 16/433,709, dated Mar. 17, 2022.
Office Action for U.S. Appl. No. 16/433,709, dated May 25, 2022.
Office Action for U.S. Appl. No. 16/433,709, dated Sep. 7, 2021.
Office Action for U.S. Appl. No. 16/513,345, dated Jan. 31, 2020.
Office Action for U.S. Appl. No. 17/015,479, dated Feb. 12, 2021.
Office Action for U.S. Appl. No. 17/221,541, dated Mar. 15, 2023.
Office Action for U.S. Appl. No. 17/221,541, dated Oct. 25, 2022.
Office Action for U.S. Appl. No. 17/246,388, dated Jul. 21, 2022.
Office Action for U.S. Appl. No. 17/404,749, dated Jul. 27, 2022.
Office Action for U.S. Appl. No. 17/496,146, dated Dec. 22, 2022.
Office Action from Chinese Patent Application No. 201811004538.4 notified Dec. 25, 2023, 11 pgs.
Office Action from Chinese Patent Application No. 201811004538.4 notified Jun. 17, 2024, 18 pgs.
Office Action from Chinese Patent Application No. 201811006541.X notified Dec. 6, 2023, 10 pgs.
Office Action from Chinese Patent Application No. 202110060921.7 notified Sep. 11, 2023, 5 pgs.
Office Action from European Patent Application No. 20217841.4 notified May 25, 2023, 9 pgs.
Office Action in Chinese Patent Application No. 201680067500.4, dated Sep. 8, 2021.
Restriction Requirement for U.S. Appl. No. 16/433,709, dated Mar. 12, 2021.
Ronciak, John A., et al., "Page-Flip Technology for use within the Linux Networking Stack," Proceedings of the Linux Symposium, vol. Two, Jul. 2004.
Satyanarayanan, et al., "The Case for VM-Based Cloudlets in Mobile Computing," IEEE Pervasive Computing, vol. 8, Issue 4, pp. 14-23, Oct. 6, 2009.
Non-Final Office Action from U.S. Appl. No. 18/109,774 notified Mar. 10, 2025, 31 pgs.
Non-Final Office Action from U.S. Appl. No. 18/618,901 notified Mar. 13, 2025, 42 pgs.
Notice of Allowance from U.S. Appl. No. 18/405,679 notified Jan. 13, 2025, 14 pgs.
Office Action from Chinese Patent Application No. 202111264658.X notified Dec. 20, 2024, 12 pgs.
Final Office Action from U.S. Appl. No. 18/618,901 notified Jul. 9, 2025, 27 pgs.
Final Office Action from U.S. Appl. No. 18/109,774 notified Aug. 12, 2025, 22 pgs.

* cited by examiner

TECHNOLOGIES FOR ALLOCATING RESOURCES ACROSS DATA CENTERS

CROSS-REFERENCE TO RELATED APPLICATIONS

This application claims the benefit of priority to U.S. Non-Provisional application Ser. No. 17/391,549, filed Aug. 2, 2021, which in turn claims the benefit of priority to U.S. Non-Provisional application Ser. No. 15/858,286, filed Dec. 29, 2017, which in turn claims the benefit of and priority to U.S. Provisional Patent Application No. 62/584,401, filed Nov. 10, 2017, and Indian Provisional Patent Application No. 201741030632, filed Aug. 30, 2017, the entire contents of which are incorporated herein by reference in their entirety.

BACKGROUND

Typically, in a group of compute devices assigned to collectively execute a workload (e.g., an application) in a data center, the resource utilization of the workload changes over time. For example, a workload may operate in a phase of relatively high memory usage and low processor usage, followed by a phase of relatively low memory usage and high processor usage. As such, an orchestrator server or other computer device that monitors the resource utilization of the workload may selectively allocate and deallocate resources (e.g., memory, data storage, processors, accelerator devices, etc.) to the group of compute devices as the workload transitions through the various phases. As such, the set of resources available to the workload may "burst" (e.g., increase) and decrease on an as-needed basis. However, in a data center in which multiple workloads are being executed concurrently, it is possible for a workload to encounter a phase that needs a particular amount of resources in order to execute at a speed specified in a service level agreement (e.g., an agreement between a customer of the data center and the data center operator) that are unavailable, such as when those resources are presently allocated to the execution of another workload in the data center.

BRIEF DESCRIPTION OF THE DRAWINGS

The concepts described herein are illustrated by way of example and not by way of limitation in the accompanying figures. For simplicity and clarity of illustration, elements illustrated in the figures are not necessarily drawn to scale. Where considered appropriate, reference labels have been repeated among the figures to indicate corresponding or analogous elements.

DETAILED DESCRIPTION OF THE DRAWINGS

Figure 1:
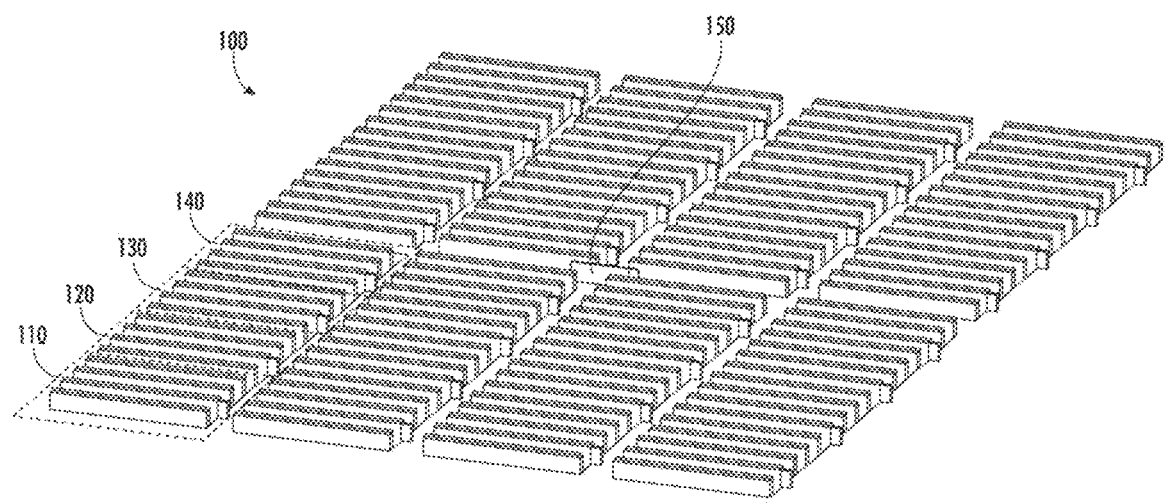
FIG. 1 is a simplified diagram of at least one embodiment of a data center for executing workloads with disaggregated resources.

While the concepts of the present disclosure are susceptible to various modifications and alternative forms, specific embodiments thereof have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described. Additionally, it should be appreciated that items included in a list in the form of "at least one A, B, and C" can mean (A); (B); (C); (A and B); (A and C); (B and C); or (A, B, and C). Similarly, items listed in the form of "at least one of A, B, or C" can mean (A); (B); (C); (A and B); (A and C); (B and C); or (A, B, and C).

The disclosed embodiments may be implemented, in some cases, in hardware, firmware, software, or any combination thereof. The disclosed embodiments may also be implemented as instructions carried by or stored on a transitory or non-transitory machine-readable (e.g., computer-readable) storage medium, which may be read and executed by one or more processors. A machine-readable storage medium may be embodied as any storage device, mechanism, or other physical structure for storing or transmitting information in a form readable by a machine (e.g., a volatile or non-volatile memory, a media disc, or other media device).

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, may not be included or may be combined with other features.

Referring now to FIG. 1, a data center 100 in which disaggregated resources may cooperatively execute one or more workloads (e.g., applications on behalf of customers) includes multiple pods 110, 120, 130, 140, each of which includes one or more rows of racks. As described in more detail herein, each rack houses multiple sleds, which each may be embodied as a compute device, such as a server, that is primarily equipped with a particular type of resource (e.g., memory devices, data storage devices, accelerator devices, general purpose processors). In the illustrative embodiment, the sleds in each pod 110, 120, 130, 140 are connected to multiple pod switches (e.g., switches that route data communications to and from sleds within the pod). The pod switches, in turn, connect with spine switches 150 that switch communications among pods (e.g., the pods 110, 120, 130, 140) in the data center 100. In some embodiments, the sleds may be connected with a fabric using Intel Omni-Path technology. As described in more detail herein, resources within sleds in the data center 100 may be allocated to a group (referred to herein as a "managed node") containing resources from one or more other sleds to be collectively utilized in the execution of a workload. The workload can execute as if the resources belonging to the managed node were located on the same sled. The resources in a managed node may even belong to sleds belonging to different racks, and even to different pods 110, 120, 130, 140. Some resources of a single sled may be allocated to one managed node while other resources of the same sled are allocated to a different managed node (e.g., one processor assigned to one managed node and another processor of the same sled assigned to a different managed node). By disaggregating resources to sleds comprised predominantly of a single type of resource (e.g., compute sleds comprising primarily compute resources, memory sleds containing primarily memory resources), and selectively allocating and deallocating the disaggregated resources to form a managed node assigned to execute a workload, the data center 100 provides more efficient resource usage over typical data centers comprised of hyperconverged servers containing compute, memory, storage and perhaps additional resources). As such, the data center 100 may provide greater performance (e.g., throughput, operations per second, latency, etc.) than a typical data center that has the same number of resources.

Figure 2:
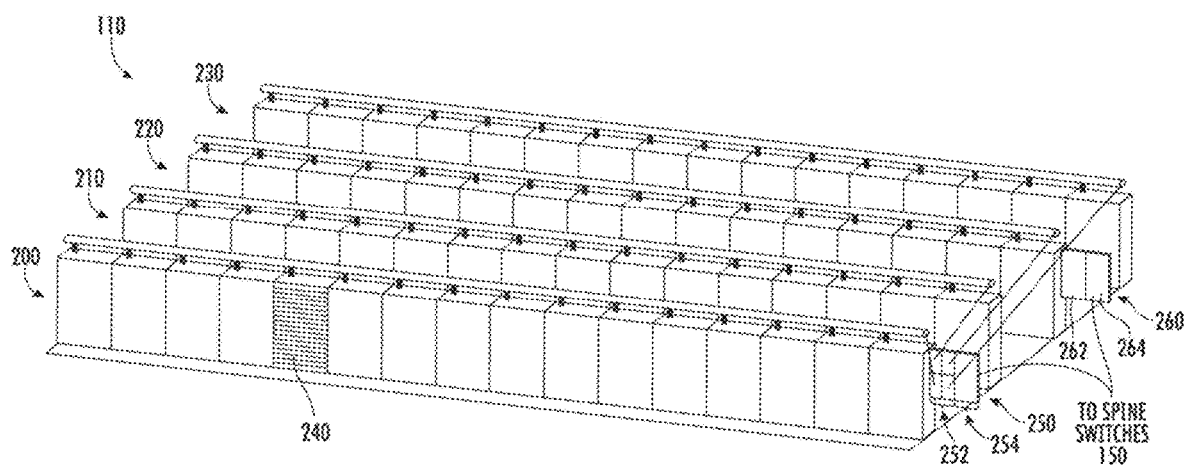
FIG. 2 is a simplified diagram of at least one embodiment of a pod of the data center of FIG. 1.

Referring now to FIG. 2, the pod 110, in the illustrative embodiment, includes a set of rows 200, 210, 220, 230 of racks 240. Each rack 240 may house multiple sleds (e.g., sixteen sleds) and provide power and data connections to the housed sleds, as described in more detail herein. In the illustrative embodiment, the racks in each row 200, 210, 220, 230 are connected to multiple pod switches 250, 260. The pod switch 250 includes a set of ports 252 to which the sleds of the racks of the pod 110 are connected and another set of ports 254 that connect the pod 110 to the spine switches 150 to provide connectivity to other pods in the data center 100. Similarly, the pod switch 260 includes a set of ports 262 to which the sleds of the racks of the pod 110 are connected and a set of ports 264 that connect the pod 110 to the spine switches 150. As such, the use of the pair of switches 250, 260 provides an amount of redundancy to the pod 110. For example, if either of the switches 250, 260 fails, the sleds in the pod 110 may still maintain data communication with the remainder of the data center 100 (e.g., sleds of other pods) through the other switch 250, 260. Furthermore, in the illustrative embodiment, the switches 150, 250, 260 may be embodied as dual-mode optical switches, capable of routing both Ethernet protocol communications carrying Internet Protocol (IP) packets and communications according to a second, high-performance link-layer protocol (e.g., Intel's Omni-Path Architecture's, Infiniband) via optical signaling media of an optical fabric.

It should be appreciated that each of the other pods 120, 130, 140 (as well as any additional pods of the data center 100) may be similarly structured as, and have components similar to, the pod 110 shown in and described in regard to FIG. 2 (e.g., each pod may have rows of racks housing multiple sleds as described above). Additionally, while two pod switches 250, 260 are shown, it should be understood that in other embodiments, each pod 110, 120, 130, 140 may be connected to different number of pod switches (e.g., providing even more failover capacity).

Figure 3:
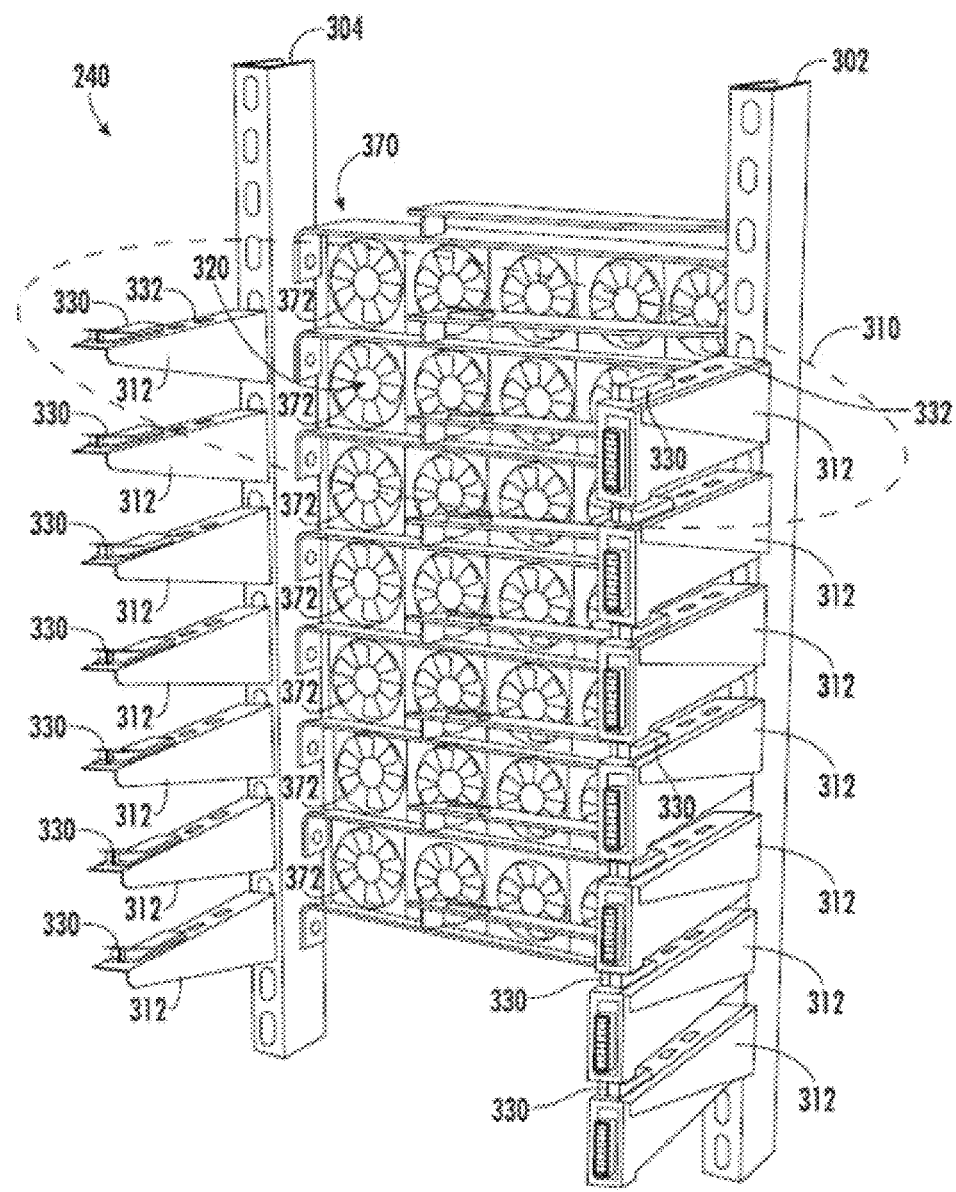
FIG. 3 is a perspective view of at least one embodiment of a rack that may be included in the pod of FIG. 2.
Figure 4:
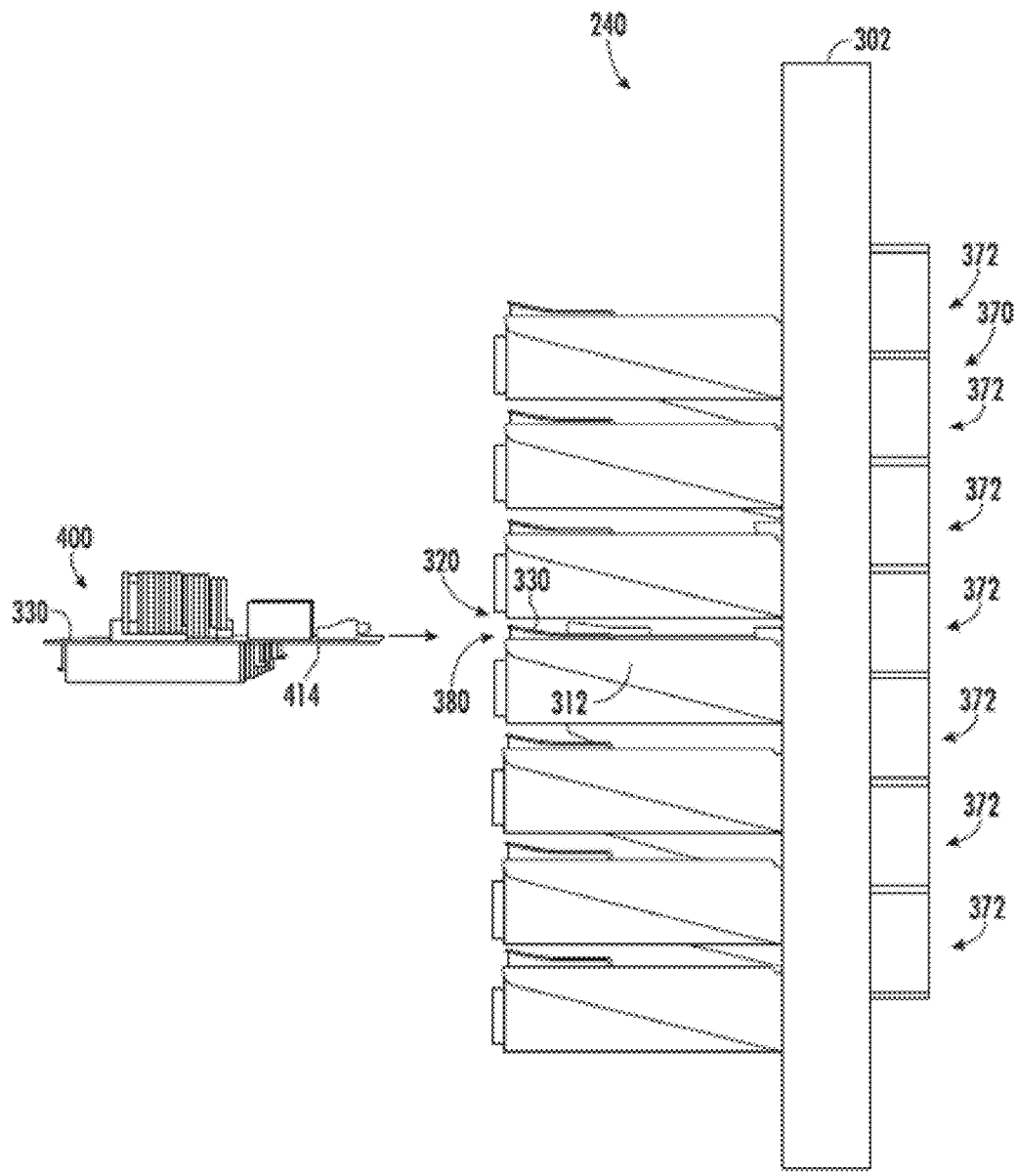
FIG. 4 is a side plan elevation view of the rack of FIG. 3.
Figure 5:
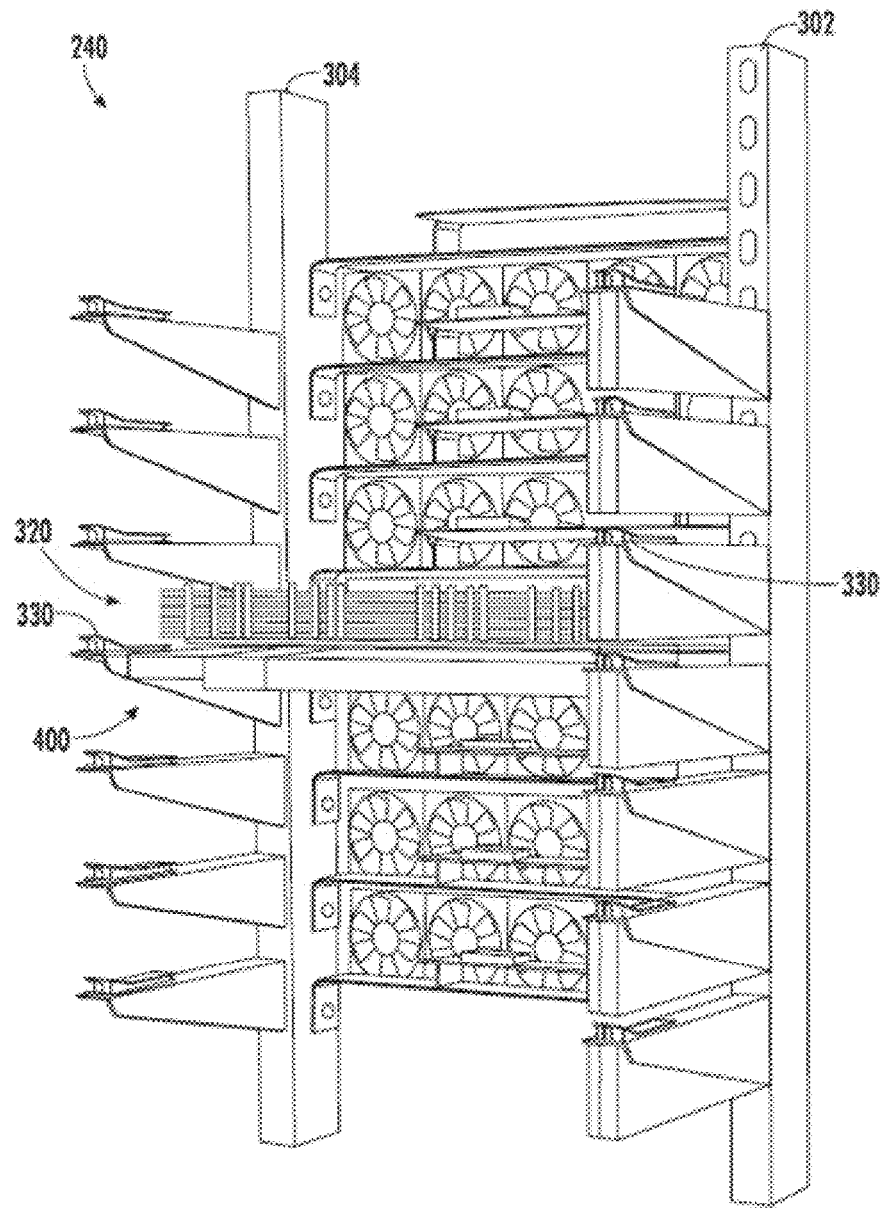
FIG. 5 is a perspective view of the rack of FIG. 3 having a sled mounted therein.

Referring now to FIGS. 3-5, each illustrative rack 240 of the data center 100 includes two elongated support posts 302, 304, which are arranged vertically. For example, the elongated support posts 302, 304 may extend upwardly from a floor of the data center 100 when deployed. The rack 240 also includes one or more horizontal pairs 310 of elongated support arms 312 (identified in FIG. 3 via a dashed ellipse) configured to support a sled of the data center 100 as discussed below. One elongated support arm 312 of the pair of elongated support arms 312 extends outwardly from the elongated support post 302 and the other elongated support arm 312 extends outwardly from the elongated support post 304.

In the illustrative embodiments, each sled of the data center 100 is embodied as a chassis-less sled. That is, each sled has a chassis-less circuit board substrate on which physical resources (e.g., processors, memory, accelerators, storage, etc.) are mounted as discussed in more detail below. As such, the rack 240 is configured to receive the chassis-less sleds. For example, each pair 310 of elongated support arms 312 defines a sled slot 320 of the rack 240, which is configured to receive a corresponding chassis-less sled. To do so, each illustrative elongated support arm 312 includes a circuit board guide 330 configured to receive the chassis-less circuit board substrate of the sled. Each circuit board guide 330 is secured to, or otherwise mounted to, a top side 332 of the corresponding elongated support arm 312. For example, in the illustrative embodiment, each circuit board guide 330 is mounted at a distal end of the corresponding elongated support arm 312 relative to the corresponding elongated support post 302, 304. For clarity of the Figures, not every circuit board guide 330 may be referenced in each Figure.

Each circuit board guide 330 includes an inner wall that defines a circuit board slot 380 configured to receive the chassis-less circuit board substrate of a sled 400 when the sled 400 is received in the corresponding sled slot 320 of the rack 240. To do so, as shown in FIG. 4, a user (or robot) aligns the chassis-less circuit board substrate of an illustrative chassis-less sled 400 to a sled slot 320. The user, or robot, may then slide the chassis-less circuit board substrate forward into the sled slot 320 such that each side edge 414 of the chassis-less circuit board substrate is received in a corresponding circuit board slot 380 of the circuit board guides 330 of the pair 310 of elongated support arms 312 that define the corresponding sled slot 320 as shown in FIG. 4. By having robotically accessible and robotically manipulable sleds comprising disaggregated resources, each type of resource can be upgraded independently of each other and at their own optimized refresh rate. Furthermore, the sleds are configured to blindly mate with power and data communication cables in each rack 240, enhancing their ability to be quickly removed, upgraded, reinstalled, and/or replaced. As such, in some embodiments, the data center 100 may operate (e.g., execute workloads, undergo maintenance and/or upgrades, etc.) without human involvement on the data center floor. In other embodiments, a human may facilitate one or more maintenance or upgrade operations in the data center 100.

It should be appreciated that each circuit board guide 330 is dual sided. That is, each circuit board guide 330 includes an inner wall that defines a circuit board slot 380 on each side of the circuit board guide 330. In this way, each circuit board guide 330 can support a chassis-less circuit board substrate on either side. As such, a single additional elongated support post may be added to the rack 240 to turn the rack 240 into a two-rack solution that can hold twice as many sled slots 320 as shown in FIG. 3. The illustrative rack 240 includes seven pairs 310 of elongated support arms 312 that define a corresponding seven sled slots 320, each configured to receive and support a corresponding sled 400 as discussed above. Of course, in other embodiments, the rack 240 may include additional or fewer pairs 310 of elongated support arms 312 (i.e., additional or fewer sled slots 320). It should be appreciated that because the sled 400 is chassis-less, the sled 400 may have an overall height that is different than typical servers. As such, in some embodiments, the height of each sled slot 320 may be shorter than the height of a typical server (e.g., shorter than a single rank unit, "1U"). That is, the vertical distance between each pair 310 of elongated support arms 312 may be less than a standard rack unit "1U." Additionally, due to the relative decrease in height of the sled slots 320, the overall height of the rack 240 in some embodiments may be shorter than the height of traditional rack enclosures. For example, in some embodiments, each of the elongated support posts 302, 304 may have a length of six feet or less. Again, in other embodiments, the rack 240 may have different dimensions. Further, it should be appreciated that the rack 240 does not include any walls, enclosures, or the like. Rather, the rack 240 is an enclosure-less rack that is opened to the local environment. Of course, in some cases, an end plate may be attached to one of the elongated support posts 302, 304 in those situations in which the rack 240 forms an end-of-row rack in the data center 100.

In some embodiments, various interconnects may be routed upwardly or downwardly through the elongated support posts 302, 304. To facilitate such routing, each elongated support post 302, 304 includes an inner wall that defines an inner chamber in which the interconnect may be located. The interconnects routed through the elongated support posts 302, 304 may be embodied as any type of interconnects including, but not limited to, data or communication interconnects to provide communication connections to each sled slot 320, power interconnects to provide power to each sled slot 320, and/or other types of interconnects.

The rack 240, in the illustrative embodiment, includes a support platform on which a corresponding optical data connector (not shown) is mounted. Each optical data connector is associated with a corresponding sled slot 320 and is configured to mate with an optical data connector of a corresponding sled 400 when the sled 400 is received in the corresponding sled slot 320. In some embodiments, optical connections between components (e.g., sleds, racks, and switches) in the data center 100 are made with a blind mate optical connection. For example, a door on each cable may prevent dust from contaminating the fiber inside the cable. In the process of connecting to a blind mate optical connector mechanism, the door is pushed open when the end of the cable enters the connector mechanism. Subsequently, the optical fiber inside the cable enters a gel within the connector mechanism and the optical fiber of one cable comes into contact with the optical fiber of another cable within the gel inside the connector mechanism.

The illustrative rack 240 also includes a fan array 370 coupled to the cross-support arms of the rack 240. The fan array 370 includes one or more rows of cooling fans 372, which are aligned in a horizontal line between the elongated support posts 302, 304. In the illustrative embodiment, the fan array 370 includes a row of cooling fans 372 for each sled slot 320 of the rack 240. As discussed above, each sled 400 does not include any on-board cooling system in the illustrative embodiment and, as such, the fan array 370 provides cooling for each sled 400 received in the rack 240. Each rack 240, in the illustrative embodiment, also includes a power supply associated with each sled slot 320. Each power supply is secured to one of the elongated support arms 312 of the pair 310 of elongated support arms 312 that define the corresponding sled slot 320. For example, the rack 240 may include a power supply coupled or secured to each elongated support arm 312 extending from the elongated support post 302. Each power supply includes a power connector configured to mate with a power connector of the sled 400 when the sled 400 is received in the corresponding sled slot 320. In the illustrative embodiment, the sled 400 does not include any on-board power supply and, as such, the power supplies provided in the rack 240 supply power to corresponding sleds 400 when mounted to the rack 240.

Figure 6:
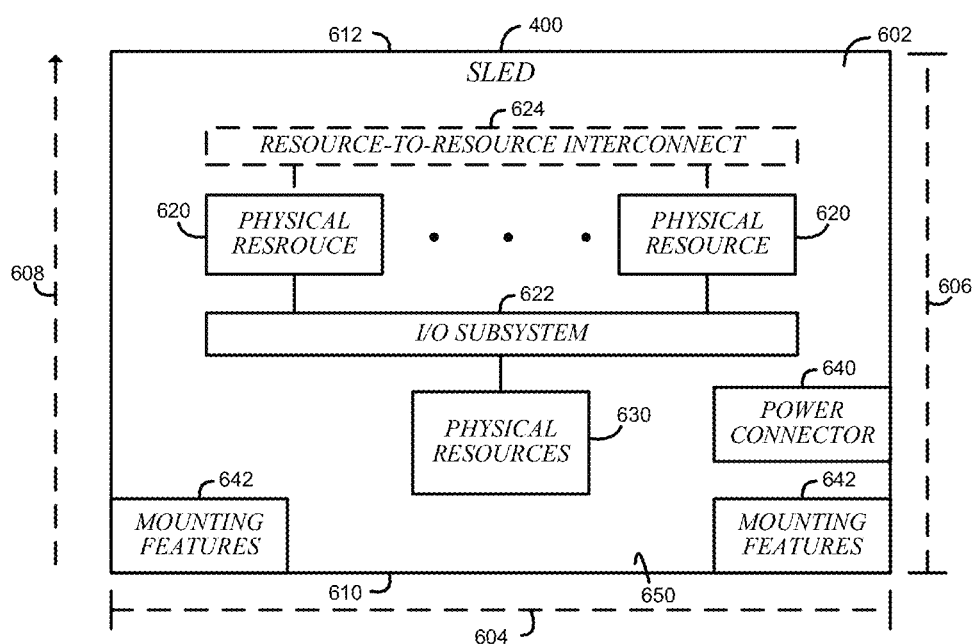
FIG. 6 is a is a simplified block diagram of at least one embodiment of a top side of the sled of FIG. 5.

Referring now to FIG. 6, the sled 400, in the illustrative embodiment, is configured to be mounted in a corresponding rack 240 of the data center 100 as discussed above. In some embodiments, each sled 400 may be optimized or otherwise configured for performing particular tasks, such as compute tasks, acceleration tasks, data storage tasks, etc. For example, the sled 400 may be embodied as a compute sled 800 as discussed below in regard to FIGS. 8-9, an accelerator sled 1000 as discussed below in regard to FIGS. 10-11, a storage sled 1200 as discussed below in regard to FIGS. 12-13, or as a sled optimized or otherwise configured to perform other specialized tasks, such as a memory sled 1400, discussed below in regard to FIG. 14.

As discussed above, the illustrative sled 400 includes a chassis-less circuit board substrate 602, which supports various physical resources (e.g., electrical components) mounted thereon. It should be appreciated that the circuit board substrate 602 is "chassis-less" in that the sled 400 does not include a housing or enclosure. Rather, the chassis-less circuit board substrate 602 is open to the local environment. The chassis-less circuit board substrate 602 may be formed from any material capable of supporting the various electrical components mounted thereon. For example, in an illustrative embodiment, the chassis-less circuit board substrate 602 is formed from an FR-4 glass-reinforced epoxy laminate material. Of course, other materials may be used to form the chassis-less circuit board substrate 602 in other embodiments.

As discussed in more detail below, the chassis-less circuit board substrate 602 includes multiple features that improve the thermal cooling characteristics of the various electrical components mounted on the chassis-less circuit board substrate 602. As discussed, the chassis-less circuit board substrate 602 does not include a housing or enclosure, which may improve the airflow over the electrical components of the sled 400 by reducing those structures that may inhibit air flow. For example, because the chassis-less circuit board substrate 602 is not positioned in an individual housing or enclosure, there is no backplane (e.g., a backplate of the chassis) to the chassis-less circuit board substrate 602, which could inhibit air flow across the electrical components. Additionally, the chassis-less circuit board substrate 602 has a geometric shape configured to reduce the length of the airflow path across the electrical components mounted to the chassis-less circuit board substrate 602. For example, the illustrative chassis-less circuit board substrate 602 has a width 604 that is greater than a depth 606 of the chassis-less circuit board substrate 602. In one particular embodiment, for example, the chassis-less circuit board substrate 602 has a width of about 21 inches and a depth of about 9 inches, compared to a typical server that has a width of about 17 inches and a depth of about 39 inches. As such, an airflow path 608 that extends from a front edge 610 of the chassis-less circuit board substrate 602 toward a rear edge 612 has a shorter distance relative to typical servers, which may improve the thermal cooling characteristics of the sled 400. Furthermore, although not illustrated in FIG. 6, the various physical resources mounted to the chassis-less circuit board substrate 602 are mounted in corresponding locations such that no two substantively heat-producing electrical components shadow each other as discussed in more detail below. That is, no two electrical components, which produce appreciable heat during operation (i.e., greater than a nominal heat sufficient enough to adversely impact the cooling of another electrical component), are mounted to the chassis-less circuit board substrate 602 linearly in-line with each other along the direction of the airflow path 608 (i.e., along a direction extending from the front edge 610 toward the rear edge 612 of the chassis-less circuit board substrate 602).

As discussed above, the illustrative sled 400 includes one or more physical resources 620 mounted to a top side 650 of the chassis-less circuit board substrate 602. Although two physical resources 620 are shown in FIG. 6, it should be appreciated that the sled 400 may include one, two, or more physical resources 620 in other embodiments. The physical resources 620 may be embodied as any type of processor, controller, or other compute circuit capable of performing various tasks such as compute functions and/or controlling the functions of the sled 400 depending on, for example, the type or intended functionality of the sled 400. For example, as discussed in more detail below, the physical resources 620 may be embodied as high-performance processors in embodiments in which the sled 400 is embodied as a compute sled, as accelerator co-processors or circuits in embodiments in which the sled 400 is embodied as an accelerator sled, storage controllers in embodiments in which the sled 400 is embodied as a storage sled, or a set of memory devices in embodiments in which the sled 400 is embodied as a memory sled.

The sled 400 also includes one or more additional physical resources 630 mounted to the top side 650 of the chassis-less circuit board substrate 602. In the illustrative embodiment, the additional physical resources include a network interface controller (NIC) as discussed in more detail below. Of course, depending on the type and functionality of the sled 400, the physical resources 630 may include additional or other electrical components, circuits, and/or devices in other embodiments.

The physical resources 620 are communicatively coupled to the physical resources 630 via an input/output (I/O) subsystem 622. The I/O subsystem 622 may be embodied as circuitry and/or components to facilitate input/output operations with the physical resources 620, the physical resources 630, and/or other components of the sled 400. For example, the I/O subsystem 622 may be embodied as, or otherwise include, memory controller hubs, input/output control hubs, integrated sensor hubs, firmware devices, communication links (e.g., point-to-point links, bus links, wires, cables, light guides, printed circuit board traces, etc.), and/or other components and subsystems to facilitate the input/output operations. In the illustrative embodiment, the I/O subsystem 622 is embodied as, or otherwise includes, a double data rate 4 (DDR4) data bus or a DDR5 data bus.

In some embodiments, the sled 400 may also include a resource-to-resource interconnect 624. The resource-to-resource interconnect 624 may be embodied as any type of communication interconnect capable of facilitating resource-to-resource communications. In the illustrative embodiment, the resource-to-resource interconnect 624 is embodied as a high-speed point-to-point interconnect (e.g., faster than the I/O subsystem 622). For example, the resource-to-resource interconnect 624 may be embodied as a QuickPath Interconnect (QPI), an UltraPath Interconnect (UPI), or other high-speed point-to-point interconnect dedicated to resource-to-resource communications.

The sled 400 also includes a power connector 640 configured to mate with a corresponding power connector of the rack 240 when the sled 400 is mounted in the corresponding rack 240. The sled 400 receives power from a power supply of the rack 240 via the power connector 640 to supply power to the various electrical components of the sled 400. That is, the sled 400 does not include any local power supply (i.e., an on-board power supply) to provide power to the electrical components of the sled 400. The exclusion of a local or on-board power supply facilitates the reduction in the overall footprint of the chassis-less circuit board substrate 602, which may increase the thermal cooling characteristics of the various electrical components mounted on the chassis-less circuit board substrate 602 as discussed above. In some embodiments, power is provided to the processors 820 through vias directly under the processors 820 (e.g., through the bottom side 750 of the chassis-less circuit board substrate 602), providing an increased thermal budget, additional current and/or voltage, and better voltage control over typical boards.

In some embodiments, the sled 400 may also include mounting features 642 configured to mate with a mounting arm, or other structure, of a robot to facilitate the placement of the sled 600 in a rack 240 by the robot. The mounting features 642 may be embodied as any type of physical structures that allow the robot to grasp the sled 400 without damaging the chassis-less circuit board substrate 602 or the electrical components mounted thereto. For example, in some embodiments, the mounting features 642 may be embodied as non-conductive pads attached to the chassis-less circuit board substrate 602. In other embodiments, the mounting features may be embodied as brackets, braces, or other similar structures attached to the chassis-less circuit board substrate 602. The particular number, shape, size, and/or make-up of the mounting feature 642 may depend on the design of the robot configured to manage the sled 400.

Figure 7:
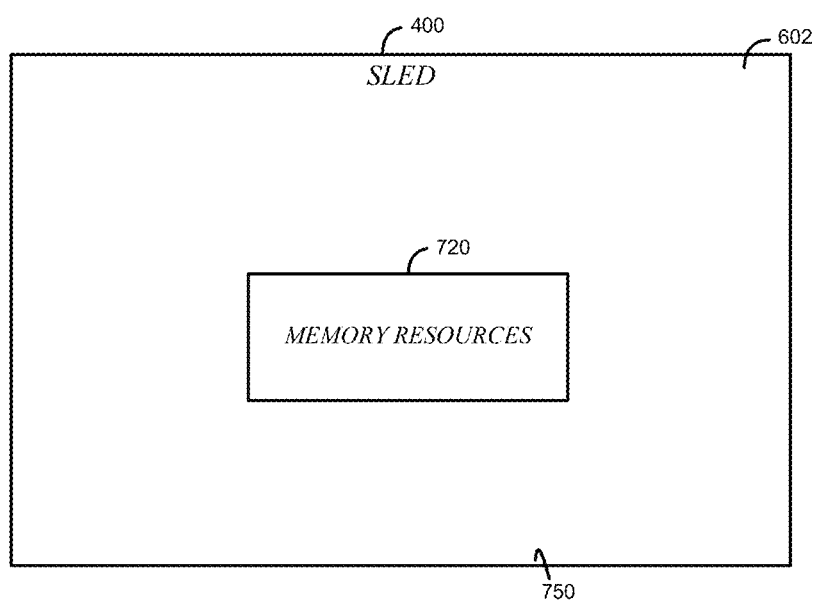
FIG. 7 is a simplified block diagram of at least one embodiment of a bottom side of the sled of FIG. 6.

Referring now to FIG. 7, in addition to the physical resources 630 mounted on the top side 650 of the chassis-less circuit board substrate 602, the sled 400 also includes one or more memory devices 720 mounted to a bottom side 750 of the chassis-less circuit board substrate 602. That is, the chassis-less circuit board substrate 602 is embodied as a double-sided circuit board. The physical resources 620 are communicatively coupled to the memory devices 720 via the I/O subsystem 622. For example, the physical resources 620 and the memory devices 720 may be communicatively coupled by one or more vias extending through the chassis-less circuit board substrate 602. Each physical resource 620 may be communicatively coupled to a different set of one or more memory devices 720 in some embodiments. Alternatively, in other embodiments, each physical resource 620 may be communicatively coupled to each memory devices 720.

The memory devices 720 may be embodied as any type of memory device capable of storing data for the physical resources 620 during operation of the sled 400, such as any type of volatile (e.g., dynamic random access memory (DRAM), etc.) or non-volatile memory. Volatile memory may be a storage medium that requires power to maintain the state of data stored by the medium. Non-limiting examples of volatile memory may include various types of random access memory (RAM), such as dynamic random access memory (DRAM) or static random access memory (SRAM). One particular type of DRAM that may be used in a memory module is synchronous dynamic random access memory (SDRAM). In particular embodiments, DRAM of a memory component may comply with a standard promulgated by JEDEC, such as JESD79F for DDR SDRAM, JESD79-2F for DDR2 SDRAM, JESD79-3F for DDR3 SDRAM, JESD79-4A for DDR4 SDRAM, JESD209 for Low Power DDR (LPDDR), JESD209-2 for LPDDR2, JESD209-3 for LPDDR3, and JESD209-4 for LPDDR4. Such standards (and similar standards) may be referred to as DDR-based standards and communication interfaces of the storage devices that implement such standards may be referred to as DDR-based interfaces.

In one embodiment, the memory device is a block addressable memory device, such as those based on NAND or NOR technologies. A memory device may also include next-generation nonvolatile devices, such as Intel 3D XPoint™ memory or other byte addressable write-in-place nonvolatile memory devices. In one embodiment, the memory device may be or may include memory devices that use chalcogenide glass, multi-threshold level NAND flash memory, NOR flash memory, single or multi-level Phase Change Memory (PCM), a resistive memory, nanowire memory, ferroelectric transistor random access memory (FeTRAM), anti-ferroelectric memory, magnetoresistive random access memory (MRAM) memory that incorporates memristor technology, resistive memory including the metal oxide base, the oxygen vacancy base and the conductive bridge Random Access Memory (CB-RAM), or spin transfer torque (STT)-MRAM, a spintronic magnetic junction memory based device, a magnetic tunneling junction (MTJ) based device, a DW (Domain Wall) and SOT (Spin Orbit Transfer) based device, a thyristor based memory device, or a combination of any of the above, or other memory. The memory device may refer to the die itself and/or to a packaged memory product. In some embodiments, the memory device may comprise a transistor-less stackable cross point architecture in which memory cells sit at the intersection of word lines and bit lines and are individually addressable and in which bit storage is based on a change in bulk resistance.

Figure 8:
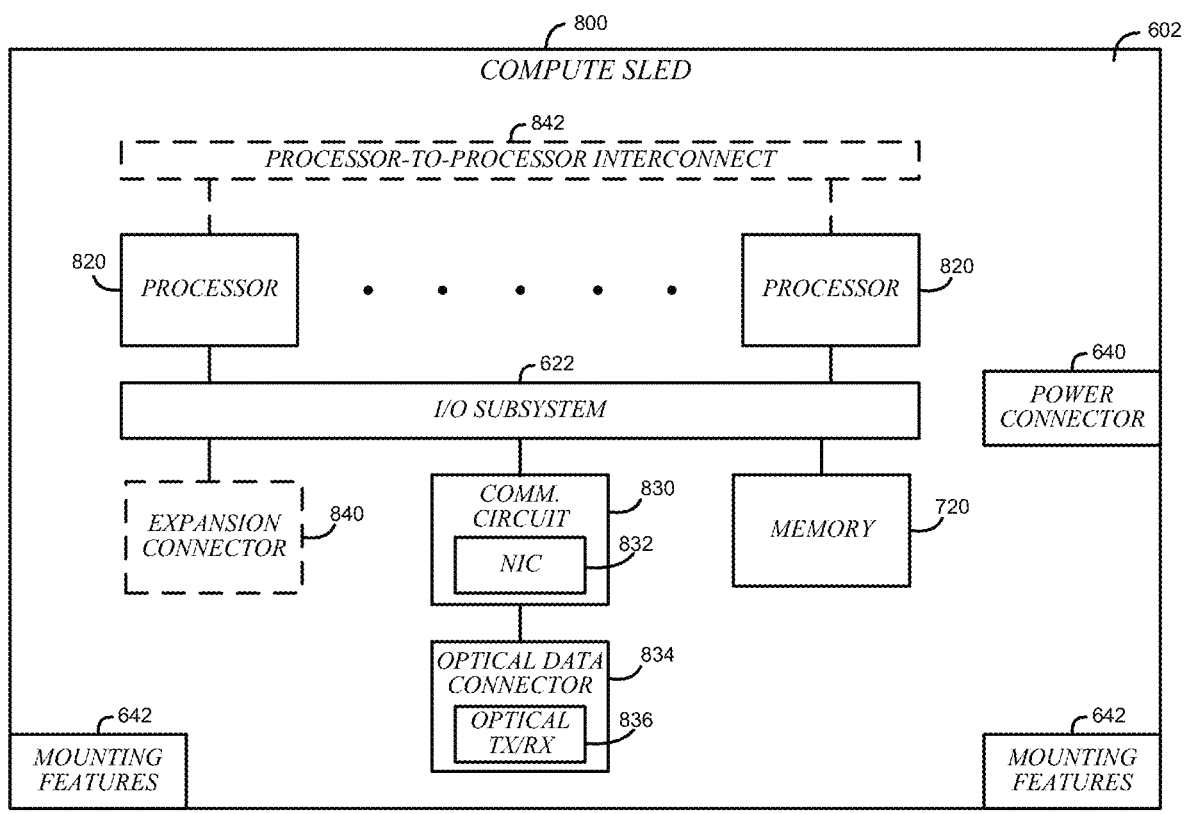
FIG. 8 is a simplified block diagram of at least one embodiment of a compute sled usable in the data center of FIG. 1.

Referring now to FIG. 8, in some embodiments, the sled 400 may be embodied as a compute sled 800. The compute sled 800 is optimized, or otherwise configured, to perform compute tasks. Of course, as discussed above, the compute sled 800 may rely on other sleds, such as acceleration sleds and/or storage sleds, to perform such compute tasks. The compute sled 800 includes various physical resources (e.g., electrical components) similar to the physical resources of the sled 400, which have been identified in FIG. 8 using the same reference numbers. The description of such components provided above in regard to FIGS. 6 and 7 applies to the corresponding components of the compute sled 800 and is not repeated herein for clarity of the description of the compute sled 800.

In the illustrative compute sled 800, the physical resources 620 are embodied as processors 820. Although only two processors 820 are shown in FIG. 8, it should be appreciated that the compute sled 800 may include additional processors 820 in other embodiments. Illustratively, the processors 820 are embodied as high-performance processors 820 and may be configured to operate at a relatively high power rating. Although the processors 820 generate additional heat operating at power ratings greater than typical processors (which operate at around 155-230 W), the enhanced thermal cooling characteristics of the chassis-less circuit board substrate 602 discussed above facilitate the higher power operation. For example, in the illustrative embodiment, the processors 820 are configured to operate at a power rating of at least 250 W. In some embodiments, the processors 820 may be configured to operate at a power rating of at least 350 W.

In some embodiments, the compute sled 800 may also include a processor-to-processor interconnect 842. Similar to the resource-to-resource interconnect 624 of the sled 400 discussed above, the processor-to-processor interconnect 842 may be embodied as any type of communication interconnect capable of facilitating processor-to-processor interconnect 842 communications. In the illustrative embodiment, the processor-to-processor interconnect 842 is embodied as a high-speed point-to-point interconnect (e.g., faster than the I/O subsystem 622). For example, the processor-to-processor interconnect 842 may be embodied as a QuickPath Interconnect (QPI), an UltraPath Interconnect (UPI), or other high-speed point-to-point interconnect dedicated to processor-to-processor communications.

The compute sled 800 also includes a communication circuit 830. The illustrative communication circuit 830 includes a network interface controller (NIC) 832, which may also be referred to as a host fabric interface (HFI). The NIC 832 may be embodied as, or otherwise include, any type of integrated circuit, discrete circuits, controller chips, chipsets, add-in-boards, daughtercards, network interface cards, other devices that may be used by the compute sled 800 to connect with another compute device (e.g., with other sleds 400). In some embodiments, the NIC 832 may be embodied as part of a system-on-a-chip (SoC) that includes one or more processors, or included on a multichip package that also contains one or more processors. In some embodiments, the NIC 832 may include a local processor (not shown) and/or a local memory (not shown) that are both local to the NIC 832. In such embodiments, the local processor of the NIC 832 may be capable of performing one or more of the functions of the processors 820. Additionally or alternatively, in such embodiments, the local memory of the NIC 832 may be integrated into one or more components of the compute sled at the board level, socket level, chip level, and/or other levels.

The communication circuit 830 is communicatively coupled to an optical data connector 834. The optical data connector 834 is configured to mate with a corresponding optical data connector of the rack 240 when the compute sled 800 is mounted in the rack 240. Illustratively, the optical data connector 834 includes a plurality of optical fibers which lead from a mating surface of the optical data connector 834 to an optical transceiver 836. The optical transceiver 836 is configured to convert incoming optical signals from the rack-side optical data connector to electrical signals and to convert electrical signals to outgoing optical signals to the rack-side optical data connector. Although shown as forming part of the optical data connector 834 in the illustrative embodiment, the optical transceiver 836 may form a portion of the communication circuit 830 in other embodiments.

In some embodiments, the compute sled 800 may also include an expansion connector 840. In such embodiments, the expansion connector 840 is configured to mate with a corresponding connector of an expansion chassis-less circuit board substrate to provide additional physical resources to the compute sled 800. The additional physical resources may be used, for example, by the processors 820 during operation of the compute sled 800. The expansion chassis-less circuit board substrate may be substantially similar to the chassis-less circuit board substrate 602 discussed above and may include various electrical components mounted thereto. The particular electrical components mounted to the expansion chassis-less circuit board substrate may depend on the intended functionality of the expansion chassis-less circuit board substrate. For example, the expansion chassis-less circuit board substrate may provide additional compute resources, memory resources, and/or storage resources. As such, the additional physical resources of the expansion chassis-less circuit board substrate may include, but is not limited to, processors, memory devices, storage devices, and/or accelerator circuits including, for example, field programmable gate arrays (FPGA), application-specific integrated circuits (ASICs), security co-processors, graphics processing units (GPUs), machine learning circuits, or other specialized processors, controllers, devices, and/or circuits.

Figure 9:
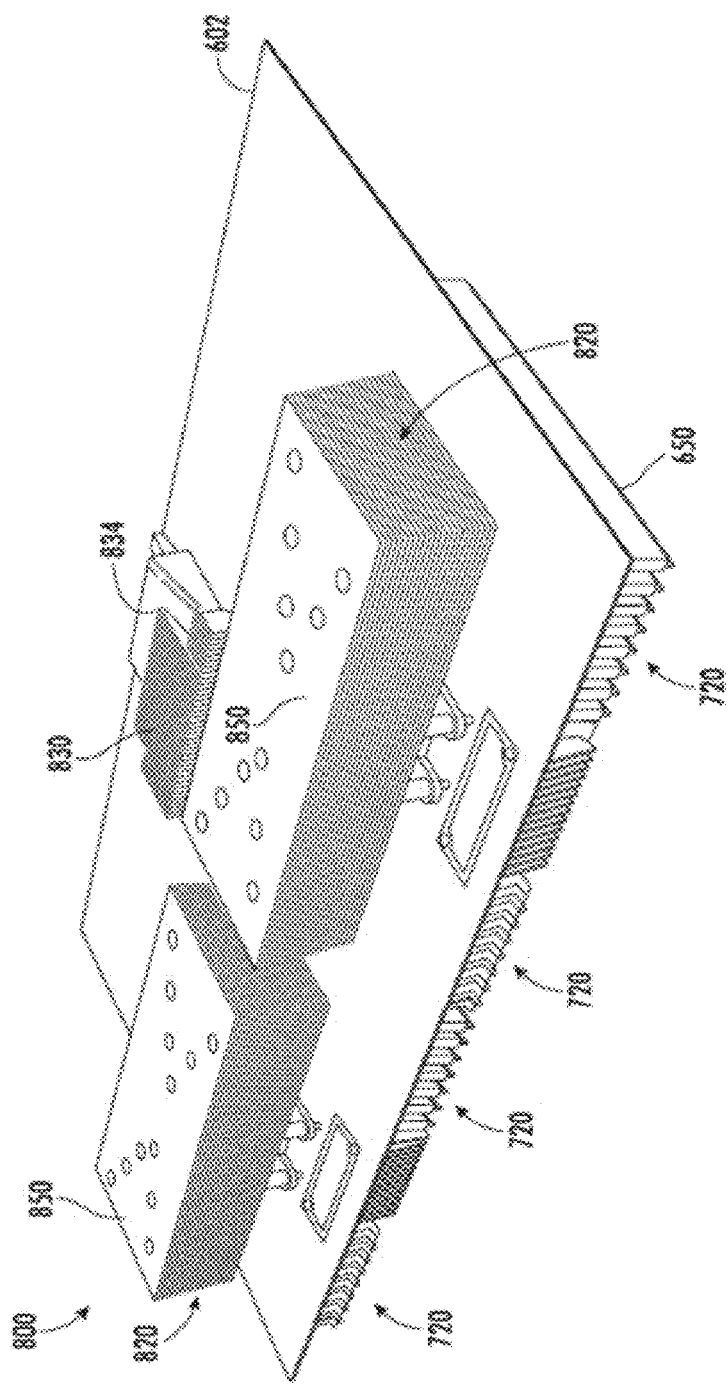
FIG. 9 is a top perspective view of at least one embodiment of the compute sled of FIG. 8.

Referring now to FIG. 9, an illustrative embodiment of the compute sled 800 is shown. As shown, the processors 820, communication circuit 830, and optical data connector 834 are mounted to the top side 650 of the chassis-less circuit board substrate 602. Any suitable attachment or mounting technology may be used to mount the physical resources of the compute sled 800 to the chassis-less circuit board substrate 602. For example, the various physical resources may be mounted in corresponding sockets (e.g., a processor socket), holders, or brackets. In some cases, some of the electrical components may be directly mounted to the chassis-less circuit board substrate 602 via soldering or similar techniques.

As discussed above, the individual processors 820 and communication circuit 830 are mounted to the top side 650 of the chassis-less circuit board substrate 602 such that no two heat-producing, electrical components shadow each other. In the illustrative embodiment, the processors 820 and communication circuit 830 are mounted in corresponding locations on the top side 650 of the chassis-less circuit board substrate 602 such that no two of those physical resources are linearly in-line with others along the direction of the airflow path 608. It should be appreciated that, although the optical data connector 834 is in-line with the communication circuit 830, the optical data connector 834 produces no or nominal heat during operation.

The memory devices 720 of the compute sled 800 are mounted to the bottom side 750 of the of the chassis-less circuit board substrate 602 as discussed above in regard to the sled 400. Although mounted to the bottom side 750, the memory devices 720 are communicatively coupled to the processors 820 located on the top side 650 via the I/O subsystem 622. Because the chassis-less circuit board substrate 602 is embodied as a double-sided circuit board, the memory devices 720 and the processors 820 may be communicatively coupled by one or more vias, connectors, or other mechanisms extending through the chassis-less circuit board substrate 602. Of course, each processor 820 may be communicatively coupled to a different set of one or more memory devices 720 in some embodiments. Alternatively, in other embodiments, each processor 820 may be communicatively coupled to each memory device 720. In some embodiments, the memory devices 720 may be mounted to one or more memory mezzanines on the bottom side of the chassis-less circuit board substrate 602 and may interconnect with a corresponding processor 820 through a ball-grid array.

Each of the processors 820 includes a heatsink 850 secured thereto. Due to the mounting of the memory devices 720 to the bottom side 750 of the chassis-less circuit board substrate 602 (as well as the vertical spacing of the sleds 400 in the corresponding rack 240), the top side 650 of the chassis-less circuit board substrate 602 includes additional "free" area or space that facilitates the use of heatsinks 850 having a larger size relative to traditional heatsinks used in typical servers. Additionally, due to the improved thermal cooling characteristics of the chassis-less circuit board substrate 602, none of the processor heatsinks 850 include cooling fans attached thereto. That is, each of the heatsinks 850 is embodied as a fan-less heatsinks.

Figure 10:
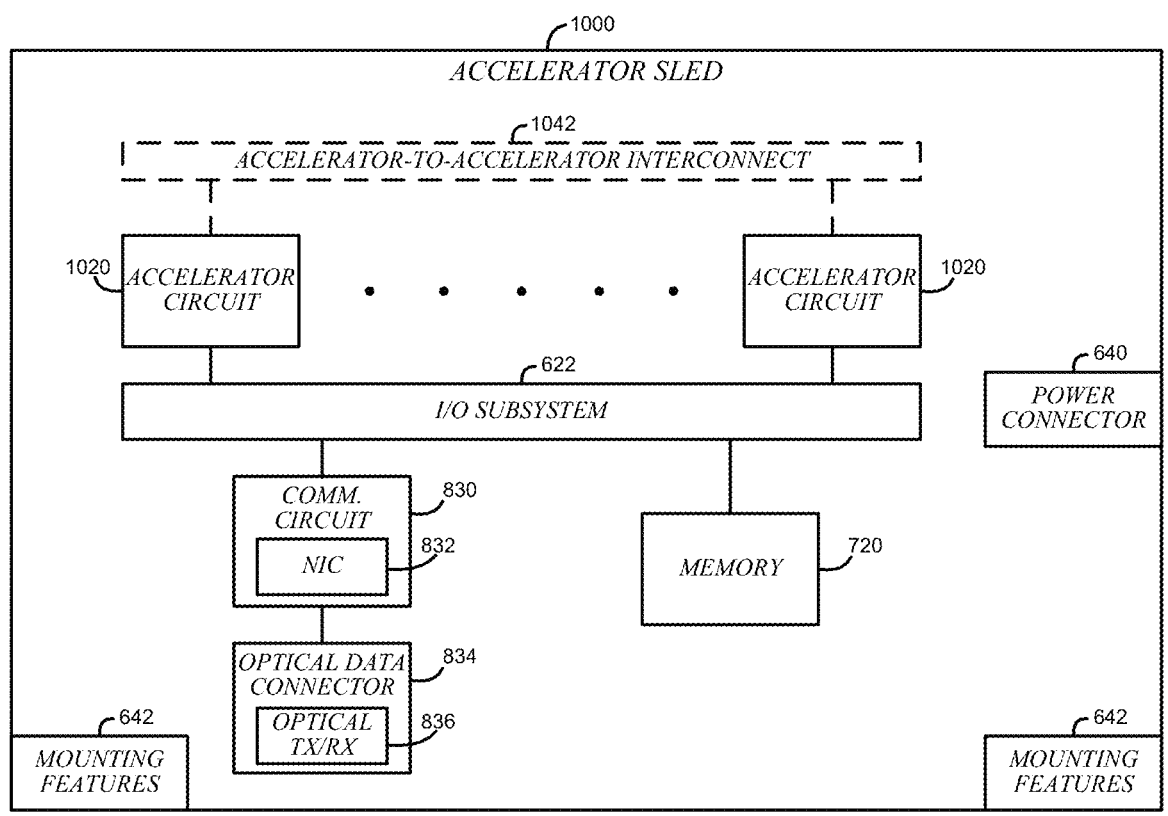
FIG. 10 is a simplified block diagram of at least one embodiment of an accelerator sled usable in the data center of FIG. 1.

Referring now to FIG. 10, in some embodiments, the sled 400 may be embodied as an accelerator sled 1000. The accelerator sled 1000 is optimized, or otherwise configured, to perform specialized compute tasks, such as machine learning, encryption, hashing, or other computational-intensive task. In some embodiments, for example, a compute sled 800 may offload tasks to the accelerator sled 1000 during operation. The accelerator sled 1000 includes various components similar to components of the sled 400 and/or compute sled 800, which have been identified in FIG. 10 using the same reference numbers. The description of such components provided above in regard to FIGS. 6, 7, and 8 apply to the corresponding components of the accelerator sled 1000 and is not repeated herein for clarity of the description of the accelerator sled 1000.

Figure 11:
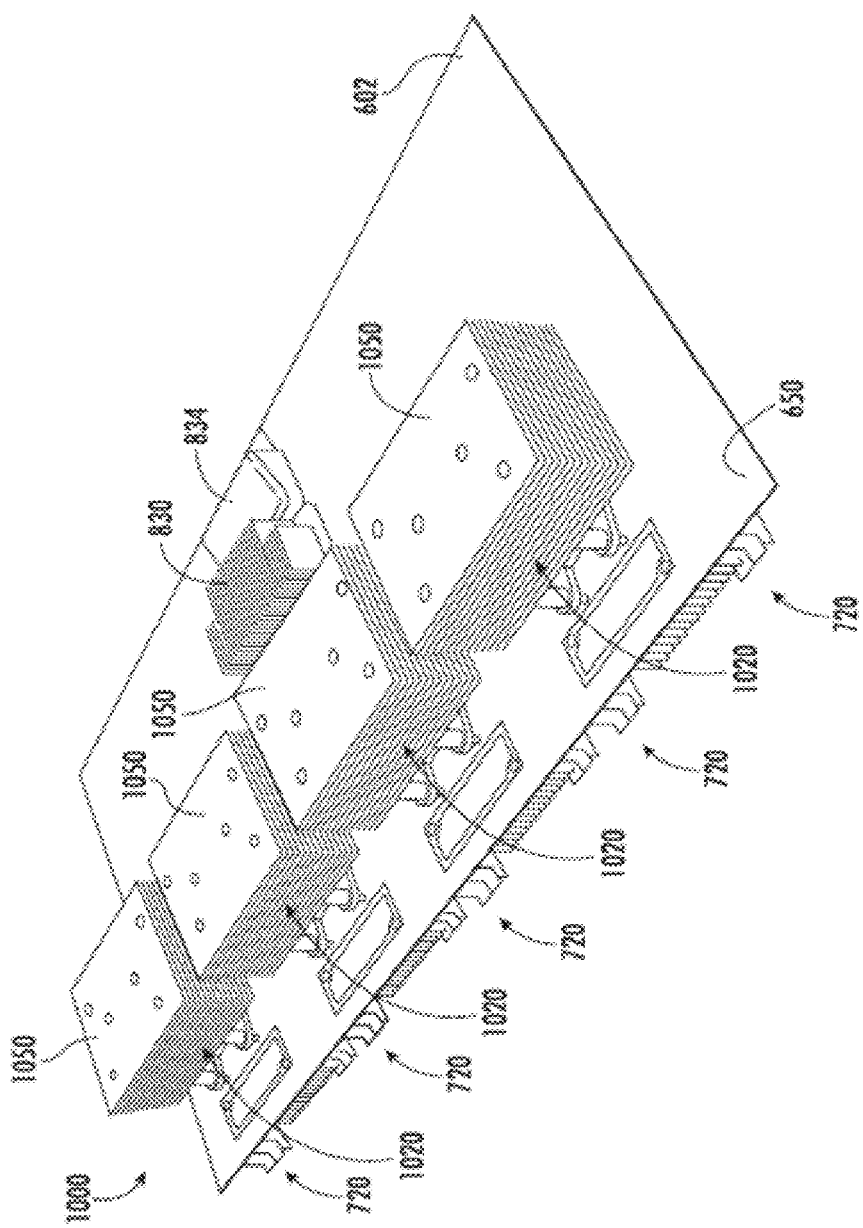
FIG. 11 is a top perspective view of at least one embodiment of the accelerator sled of FIG. 10.

In the illustrative accelerator sled 1000, the physical resources 620 are embodied as accelerator circuits 1020. Although only two accelerator circuits 1020 are shown in FIG. 10, it should be appreciated that the accelerator sled 1000 may include additional accelerator circuits 1020 in other embodiments. For example, as shown in FIG. 11, the accelerator sled 1000 may include four accelerator circuits 1020 in some embodiments. The accelerator circuits 1020 may be embodied as any type of processor, co-processor, compute circuit, or other device capable of performing compute or processing operations. For example, the accelerator circuits 1020 may be embodied as, for example, field programmable gate arrays (FPGA), application-specific integrated circuits (ASICs), security co-processors, graphics processing units (GPUs), machine learning circuits, or other specialized processors, controllers, devices, and/or circuits.

In some embodiments, the accelerator sled 1000 may also include an accelerator-to-accelerator interconnect 1042. Similar to the resource-to-resource interconnect 624 of the sled 600 discussed above, the accelerator-to-accelerator interconnect 1042 may be embodied as any type of communication interconnect capable of facilitating accelerator-to-accelerator communications. In the illustrative embodiment, the accelerator-to-accelerator interconnect 1042 is embodied as a high-speed point-to-point interconnect (e.g., faster than the I/O subsystem 622). For example, the accelerator-to-accelerator interconnect 1042 may be embodied as a QuickPath Interconnect (QPI), an UltraPath Interconnect (UPI), or other high-speed point-to-point interconnect dedicated to processor-to-processor communications. In some embodiments, the accelerator circuits 1020 may be daisy-chained with a primary accelerator circuit 1020 connected to the NIC 832 and memory 720 through the I/O subsystem 622 and a secondary accelerator circuit 1020 connected to the NIC 832 and memory 720 through a primary accelerator circuit 1020.

Referring now to FIG. 11, an illustrative embodiment of the accelerator sled 1000 is shown. As discussed above, the accelerator circuits 1020, communication circuit 830, and optical data connector 834 are mounted to the top side 650 of the chassis-less circuit board substrate 602. Again, the individual accelerator circuits 1020 and communication circuit 830 are mounted to the top side 650 of the chassis-less circuit board substrate 602 such that no two heat-producing, electrical components shadow each other as discussed above. The memory devices 720 of the accelerator sled 1000 are mounted to the bottom side 750 of the of the chassis-less circuit board substrate 602 as discussed above in regard to the sled 600. Although mounted to the bottom side 750, the memory devices 720 are communicatively coupled to the accelerator circuits 1020 located on the top side 650 via the I/O subsystem 622 (e.g., through vias). Further, each of the accelerator circuits 1020 may include a heatsink 1070 that is larger than a traditional heatsink used in a server. As discussed above with reference to the heatsinks 870, the heatsinks 1070 may be larger than tradition heatsinks because of the "free" area provided by the memory devices 750 being located on the bottom side 750 of the chassis-less circuit board substrate 602 rather than on the top side 650.

Figure 12:
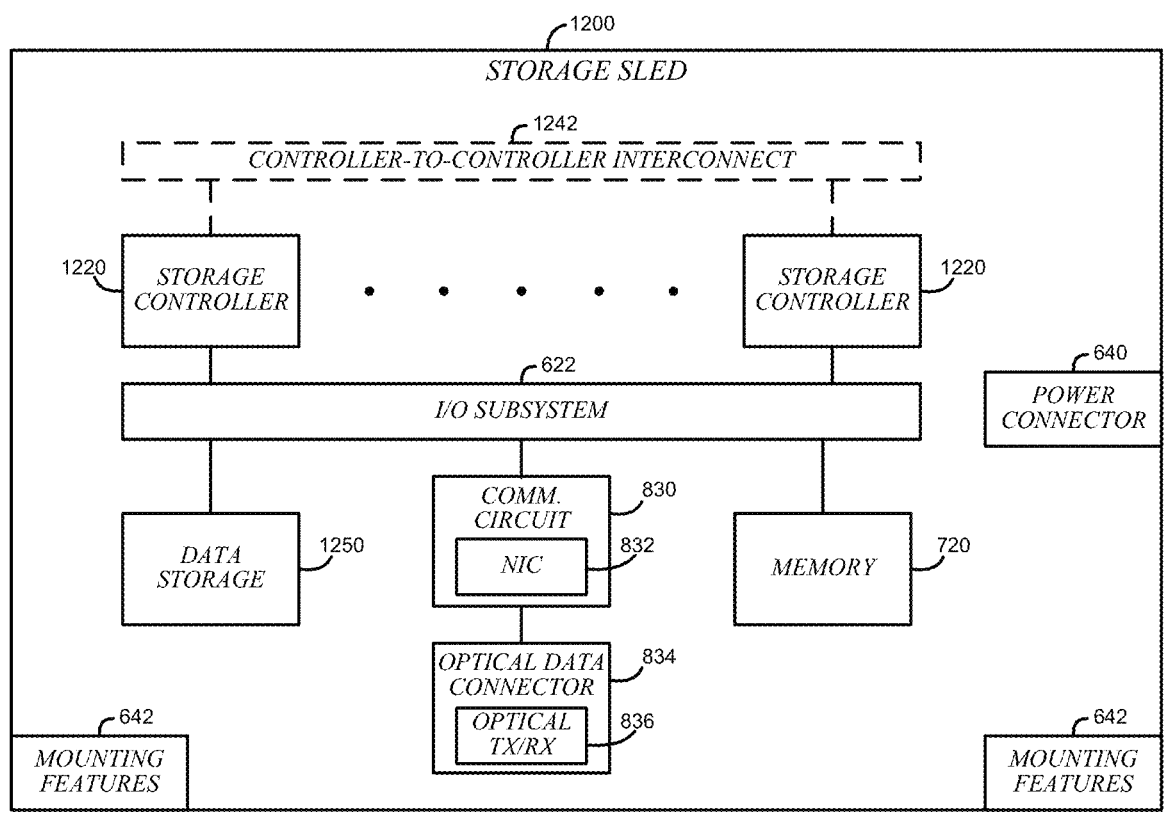
FIG. 12 is a simplified block diagram of at least one embodiment of a storage sled usable in the data center of FIG. 1.

Referring now to FIG. 12, in some embodiments, the sled 400 may be embodied as a storage sled 1200. The storage sled 1200 is optimized, or otherwise configured, to store data in a data storage 1250 local to the storage sled 1200. For example, during operation, a compute sled 800 or an accelerator sled 1000 may store and retrieve data from the data storage 1250 of the storage sled 1200. The storage sled 1200 includes various components similar to components of the sled 400 and/or the compute sled 800, which have been identified in FIG. 12 using the same reference numbers. The description of such components provided above in regard to FIGS. 6, 7, and 8 apply to the corresponding components of the storage sled 1200 and is not repeated herein for clarity of the description of the storage sled 1200.

In the illustrative storage sled 1200, the physical resources 620 are embodied as storage controllers 1220. Although only two storage controllers 1220 are shown in FIG. 12, it should be appreciated that the storage sled 1200 may include additional storage controllers 1220 in other embodiments. The storage controllers 1220 may be embodied as any type of processor, controller, or control circuit capable of controlling the storage and retrieval of data into the data storage 1250 based on requests received via the communication circuit 830. In the illustrative embodiment, the storage controllers 1220 are embodied as relatively low-power processors or controllers. For example, in some embodiments, the storage controllers 1220 may be configured to operate at a power rating of about 75 watts.

In some embodiments, the storage sled 1200 may also include a controller-to-controller interconnect 1242. Similar to the resource-to-resource interconnect 624 of the sled 400 discussed above, the controller-to-controller interconnect 1242 may be embodied as any type of communication interconnect capable of facilitating controller-to-controller communications. In the illustrative embodiment, the controller-to-controller interconnect 1242 is embodied as a high-speed point-to-point interconnect (e.g., faster than the I/O subsystem 622). For example, the controller-to-controller interconnect 1242 may be embodied as a QuickPath Interconnect (QPI), an UltraPath Interconnect (UPI), or other high-speed point-to-point interconnect dedicated to processor-to-processor communications.

Figure 13:
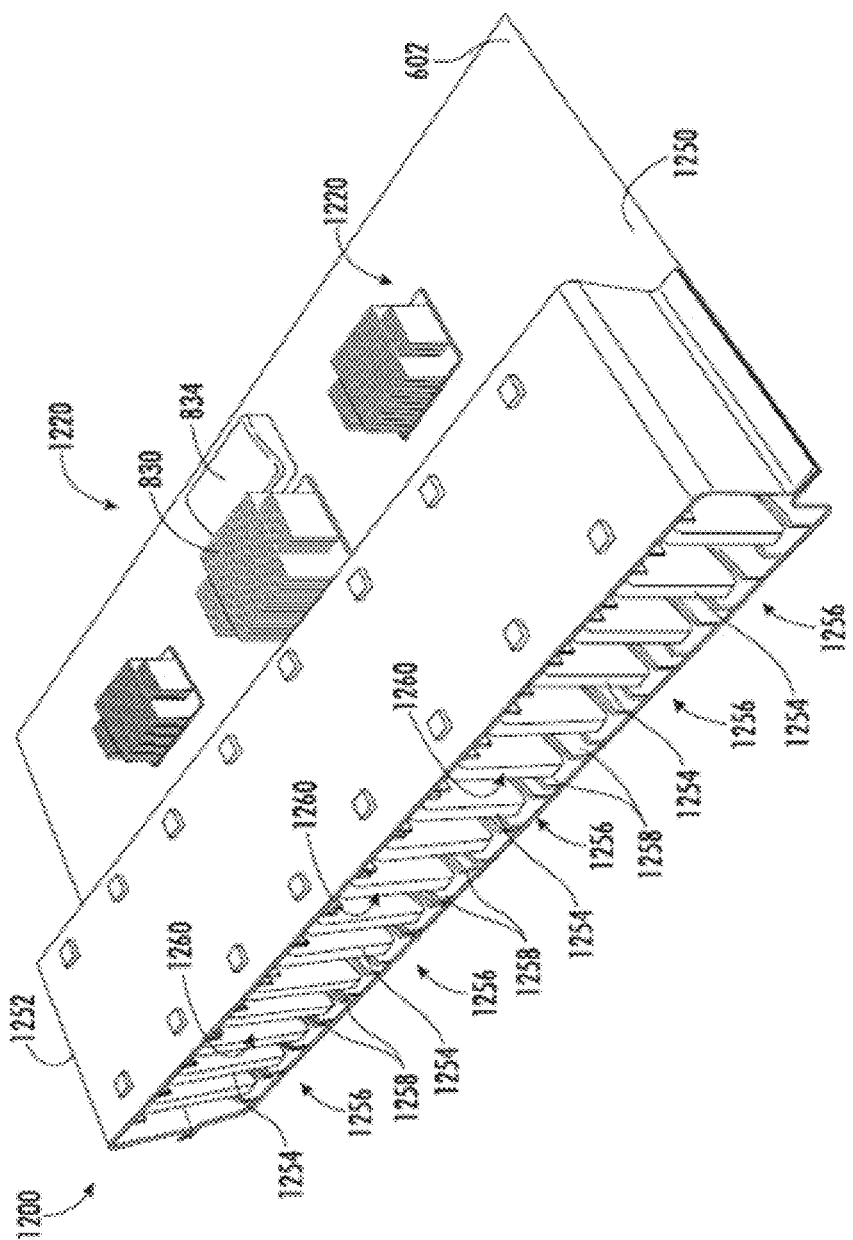
FIG. 13 is a top perspective view of at least one embodiment of the storage sled of FIG. 12.

Referring now to FIG. 13, an illustrative embodiment of the storage sled 1200 is shown. In the illustrative embodiment, the data storage 1250 is embodied as, or otherwise includes, a storage cage 1252 configured to house one or more solid state drives (SSDs) 1254. To do so, the storage cage 1252 includes a number of mounting slots 1256, each of which is configured to receive a corresponding solid state drive 1254. Each of the mounting slots 1256 includes a number of drive guides 1258 that cooperate to define an access opening 1260 of the corresponding mounting slot 1256. The storage cage 1252 is secured to the chassis-less circuit board substrate 602 such that the access openings face away from (i.e., toward the front of) the chassis-less circuit board substrate 602. As such, solid state drives 1254 are accessible while the storage sled 1200 is mounted in a corresponding rack 204. For example, a solid state drive 1254 may be swapped out of a rack 240 (e.g., via a robot) while the storage sled 1200 remains mounted in the corresponding rack 240.

The storage cage 1252 illustratively includes sixteen mounting slots 1256 and is capable of mounting and storing sixteen solid state drives 1254. Of course, the storage cage 1252 may be configured to store additional or fewer solid state drives 1254 in other embodiments. Additionally, in the illustrative embodiment, the solid state drivers are mounted vertically in the storage cage 1252, but may be mounted in the storage cage 1252 in a different orientation in other embodiments. Each solid state drive 1254 may be embodied as any type of data storage device capable of storing long term data. To do so, the solid state drives 1254 may include volatile and non-volatile memory devices discussed above.

As shown in FIG. 13, the storage controllers 1220, the communication circuit 830, and the optical data connector 834 are illustratively mounted to the top side 650 of the chassis-less circuit board substrate 602. Again, as discussed above, any suitable attachment or mounting technology may be used to mount the electrical components of the storage sled 1200 to the chassis-less circuit board substrate 602 including, for example, sockets (e.g., a processor socket), holders, brackets, soldered connections, and/or other mounting or securing techniques.

As discussed above, the individual storage controllers 1220 and the communication circuit 830 are mounted to the top side 650 of the chassis-less circuit board substrate 602 such that no two heat-producing, electrical components shadow each other. For example, the storage controllers 1220 and the communication circuit 830 are mounted in corresponding locations on the top side 650 of the chassis-less circuit board substrate 602 such that no two of those electrical components are linearly in-line with other along the direction of the airflow path 608.

The memory devices 720 of the storage sled 1200 are mounted to the bottom side 750 of the of the chassis-less circuit board substrate 602 as discussed above in regard to the sled 400. Although mounted to the bottom side 750, the memory devices 720 are communicatively coupled to the storage controllers 1220 located on the top side 650 via the I/O subsystem 622. Again, because the chassis-less circuit board substrate 602 is embodied as a double-sided circuit board, the memory devices 720 and the storage controllers 1220 may be communicatively coupled by one or more vias, connectors, or other mechanisms extending through the chassis-less circuit board substrate 602. Each of the storage controllers 1220 includes a heatsink 1270 secured thereto. As discussed above, due to the improved thermal cooling characteristics of the chassis-less circuit board substrate 602 of the storage sled 1200, none of the heatsinks 1270 include cooling fans attached thereto. That is, each of the heatsinks 1270 is embodied as a fan-less heatsink.

Figure 14:
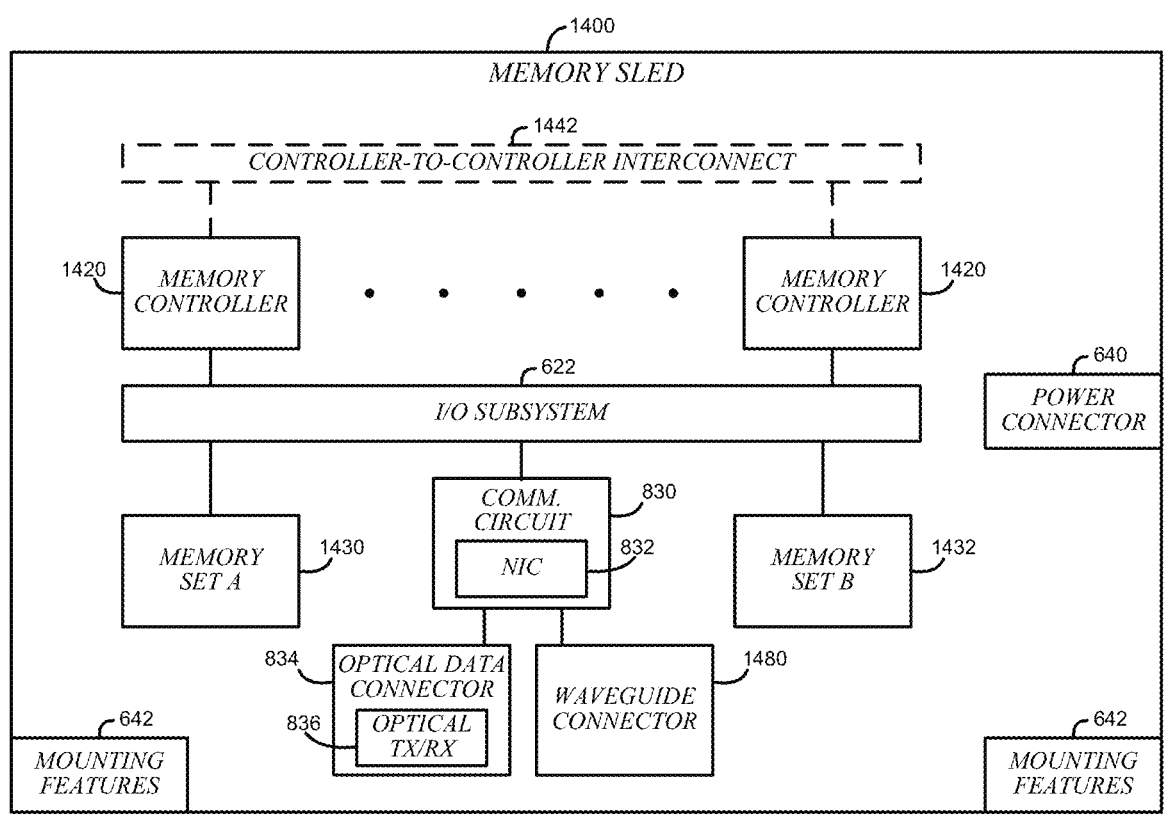
FIG. 14 is a simplified block diagram of at least one embodiment of a memory sled usable in the data center of FIG. 1.

Referring now to FIG. 14, in some embodiments, the sled 400 may be embodied as a memory sled 1400. The storage sled 1400 is optimized, or otherwise configured, to provide other sleds 400 (e.g., compute sleds 800, accelerator sleds 1000, etc.) with access to a pool of memory (e.g., in two or more sets 1430, 1432 of memory devices 720) local to the memory sled 1200. For example, during operation, a compute sled 800 or an accelerator sled 1000 may remotely write to and/or read from one or more of the memory sets 1430, 1432 of the memory sled 1200 using a logical address space that maps to physical addresses in the memory sets 1430, 1432. The memory sled 1400 includes various components similar to components of the sled 400 and/or the compute sled 800, which have been identified in FIG. 14 using the same reference numbers. The description of such components provided above in regard to FIGS. 6, 7, and 8 apply to the corresponding components of the memory sled 1400 and is not repeated herein for clarity of the description of the memory sled 1400.

In the illustrative memory sled 1400, the physical resources 620 are embodied as memory controllers 1420. Although only two memory controllers 1420 are shown in FIG. 14, it should be appreciated that the memory sled 1400 may include additional memory controllers 1420 in other embodiments. The memory controllers 1420 may be embodied as any type of processor, controller, or control circuit capable of controlling the writing and reading of data into the memory sets 1430, 1432 based on requests received via the communication circuit 830. In the illustrative embodiment, each storage controller 1220 is connected to a corresponding memory set 1430, 1432 to write to and read from memory devices 720 within the corresponding memory set 1430, 1432 and enforce any permissions (e.g., read, write, etc.) associated with sled 400 that has sent a request to the memory sled 1400 to perform a memory access operation (e.g., read or write).

In some embodiments, the memory sled 1400 may also include a controller-to-controller interconnect 1442. Similar to the resource-to-resource interconnect 624 of the sled 400 discussed above, the controller-to-controller interconnect 1442 may be embodied as any type of communication interconnect capable of facilitating controller-to-controller communications. In the illustrative embodiment, the controller-to-controller interconnect 1442 is embodied as a high-speed point-to-point interconnect (e.g., faster than the I/O subsystem 622). For example, the controller-to-controller interconnect 1442 may be embodied as a QuickPath Interconnect (QPI), an UltraPath Interconnect (UPI), or other high-speed point-to-point interconnect dedicated to processor-to-processor communications. As such, in some embodiments, a memory controller 1420 may access, through the controller-to-controller interconnect 1442, memory that is within the memory set 1432 associated with another memory controller 1420. In some embodiments, a scalable memory controller is made of multiple smaller memory controllers, referred to herein as "chiplets", on a memory sled (e.g., the memory sled 1400). The chiplets may be interconnected (e.g., using EMIB (Embedded Multi-Die Interconnect Bridge)). The combined chiplet memory controller may scale up to a relatively large number of memory controllers and I/O ports, (e.g., up to 16 memory channels). In some embodiments, the memory controllers 1420 may implement a memory interleave (e.g., one memory address is mapped to the memory set 1430, the next memory address is mapped to the memory set 1432, and the third address is mapped to the memory set 1430, etc.). The interleaving may be managed within the memory controllers 1420, or from CPU sockets (e.g., of the compute sled 800) across network links to the memory sets 1430, 1432, and may improve the latency associated with performing memory access operations as compared to accessing contiguous memory addresses from the same memory device.

Further, in some embodiments, the memory sled 1400 may be connected to one or more other sleds 400 (e.g., in the same rack 240 or an adjacent rack 240) through a waveguide, using the waveguide connector 1480. In the illustrative embodiment, the waveguides are 64 millimeter waveguides that provide 16 Rx (i.e., receive) lanes and 16 Rt (i.e., transmit) lanes. Each lane, in the illustrative embodiment, is either 16 Ghz or 32 Ghz. In other embodiments, the frequencies may be different. Using a waveguide may provide high throughput access to the memory pool (e.g., the memory sets 1430, 1432) to another sled (e.g., a sled 400 in the same rack 240 or an adjacent rack 240 as the memory sled 1400) without adding to the load on the optical data connector 834.

Figure 15:
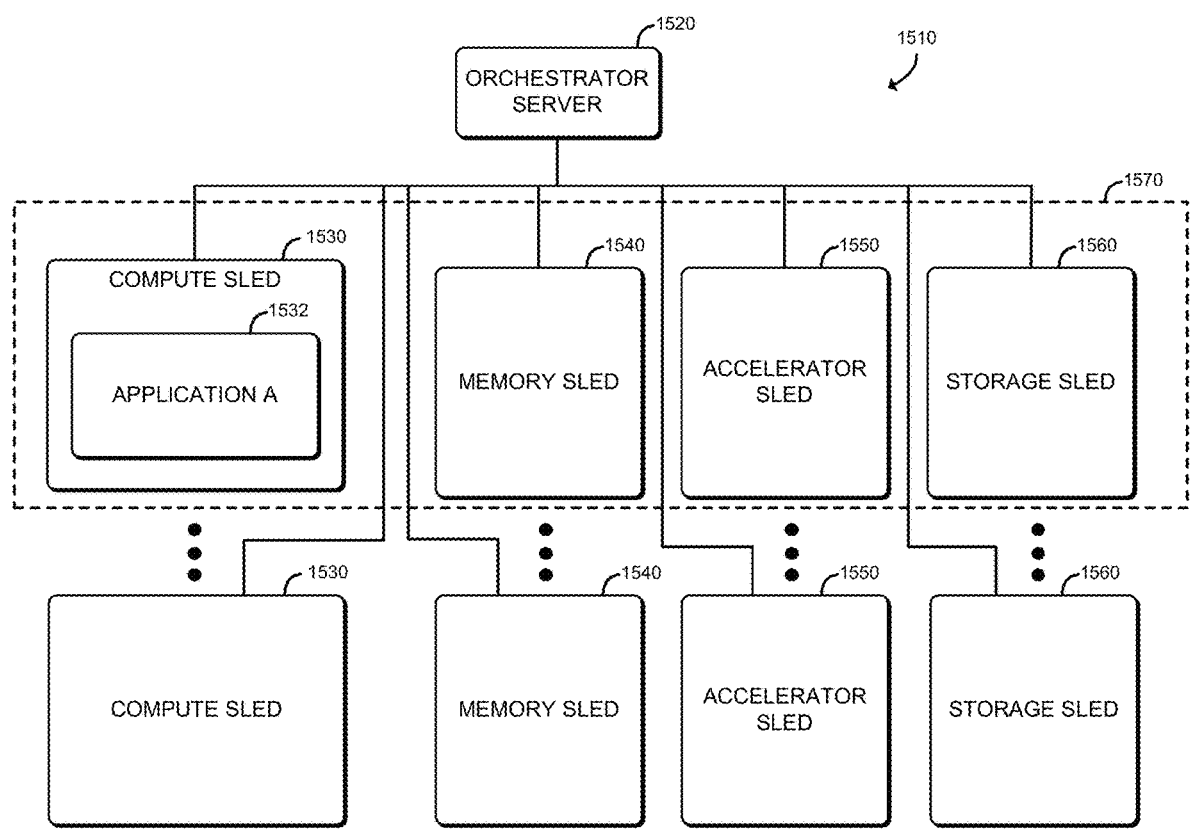
FIG. 15 is a simplified block diagram of a system that may be established within the data center of FIG. 1 to execute workloads with managed nodes composed of disaggregated resources.

Referring now to FIG. 15, a system for executing one or more workloads (e.g., applications) may be implemented in accordance with the data center 100. In the illustrative embodiment, the system 1510 includes an orchestrator server 1520, which may be embodied as a managed node comprising a compute device (e.g., a compute sled 800) executing management software (e.g., a cloud operating environment, such as OpenStack) that is communicatively coupled to multiple sleds 400 including a large number of compute sleds 1530 (e.g., each similar to the compute sled 800), memory sleds 1540 (e.g., each similar to the memory sled 1400), accelerator sleds 1550 (e.g., each similar to the memory sled 1000), and storage sleds 1560 (e.g., each similar to the storage sled 1200). One or more of the sleds 1530, 1540, 1550, 1560 may be grouped into a managed node 1570, such as by the orchestrator server 1520, to collectively perform a workload (e.g., an application 1532 executed in a virtual machine or in a container). The managed node 1570 may be embodied as an assembly of physical resources 620, such as processors 820, memory resources 720, accelerator circuits 1020, or data storage 1250, from the same or different sleds 400. Further, the managed node may be established, defined, or "spun up" by the orchestrator server 1520 at the time a workload is to be assigned to the managed node or at any other time, and may exist regardless of whether any workloads are presently assigned to the managed node. In the illustrative embodiment, the orchestrator server 1520 may selectively allocate and/or deallocate physical resources 620 from the sleds 400 and/or add or remove one or more sleds 400 from the managed node 1570 as a function of quality of service (QoS) targets (e.g., performance targets associated with a throughput, latency, instructions per second, etc.) associated with a service level agreement for the workload (e.g., the application 1532). In doing so, the orchestrator server 1520 may receive telemetry data indicative of performance conditions (e.g., throughput, latency, instructions per second, etc.) in each sled 400 of the managed node 1570 and compare the telemetry data to the quality of service targets to determine whether the quality of service targets are being satisfied. If the so, the orchestrator server 1520 may additionally determine whether one or more physical resources may be deallocated from the managed node 1570 while still satisfying the QoS targets, thereby freeing up those physical resources for use in another managed node (e.g., to execute a different workload). Alternatively, if the QoS targets are not presently satisfied, the orchestrator server 1520 may determine to dynamically allocate additional physical resources to assist in the execution of the workload (e.g., the application 1532) while the workload is executing.

Additionally, in some embodiments, the orchestrator server 1520 may identify trends in the resource utilization of the workload (e.g., the application 1532), such as by identifying phases of execution (e.g., time periods in which different operations, each having different resource utilizations characteristics, are performed) of the workload (e.g., the application 1532) and pre-emptively identifying available resources in the data center 100 and allocating them to the managed node 1570 (e.g., within a predefined time period of the associated phase beginning). In some embodiments, the orchestrator server 1520 may model performance based on various latencies and a distribution scheme to place workloads among compute sleds and other resources (e.g., accelerator sleds, memory sleds, storage sleds) in the data center 100. For example, the orchestrator server 1520 may utilize a model that accounts for the performance of resources on the sleds 400 (e.g., FPGA performance, memory access latency, etc.) and the performance (e.g., congestion, latency, bandwidth) of the path through the network to the resource (e.g., FPGA). As such, the orchestrator server 1520 may determine which resource(s) should be used with which workloads based on the total latency associated with each potential resource available in the data center 100 (e.g., the latency associated with the performance of the resource itself in addition to the latency associated with the path through the network between the compute sled executing the workload and the sled 400 on which the resource is located).

In some embodiments, the orchestrator server 1520 may generate a map of heat generation in the data center 100 using telemetry data (e.g., temperatures, fan speeds, etc.) reported from the sleds 400 and allocate resources to managed nodes as a function of the map of heat generation and predicted heat generation associated with different workloads, to maintain a target temperature and heat distribution in the data center 100. Additionally or alternatively, in some embodiments, the orchestrator server 1520 may organize received telemetry data into a hierarchical model that is indicative of a relationship between the managed nodes (e.g., a spatial relationship such as the physical locations of the resources of the managed nodes within the data center 100 and/or a functional relationship, such as groupings of the managed nodes by the customers the managed nodes provide services for, the types of functions typically performed by the managed nodes, managed nodes that typically share or exchange workloads among each other, etc.). Based on differences in the physical locations and resources in the managed nodes, a given workload may exhibit different resource utilizations (e.g., cause a different internal temperature, use a different percentage of processor or memory capacity) across the resources of different managed nodes. The orchestrator server 1520 may determine the differences based on the telemetry data stored in the hierarchical model and factor the differences into a prediction of future resource utilization of a workload if the workload is reassigned from one managed node to another managed node, to accurately balance resource utilization in the data center 100.

To reduce the computational load on the orchestrator server 1520 and the data transfer load on the network, in some embodiments, the orchestrator server 1520 may send self-test information to the sleds 400 to enable each sled 400 to locally (e.g., on the sled 400) determine whether telemetry data generated by the sled 400 satisfies one or more conditions (e.g., an available capacity that satisfies a predefined threshold, a temperature that satisfies a predefined threshold, etc.). Each sled 400 may then report back a simplified result (e.g., yes or no) to the orchestrator server 1520, which the orchestrator server 1520 may utilize in determining the allocation of resources to managed nodes.

Figure 16:
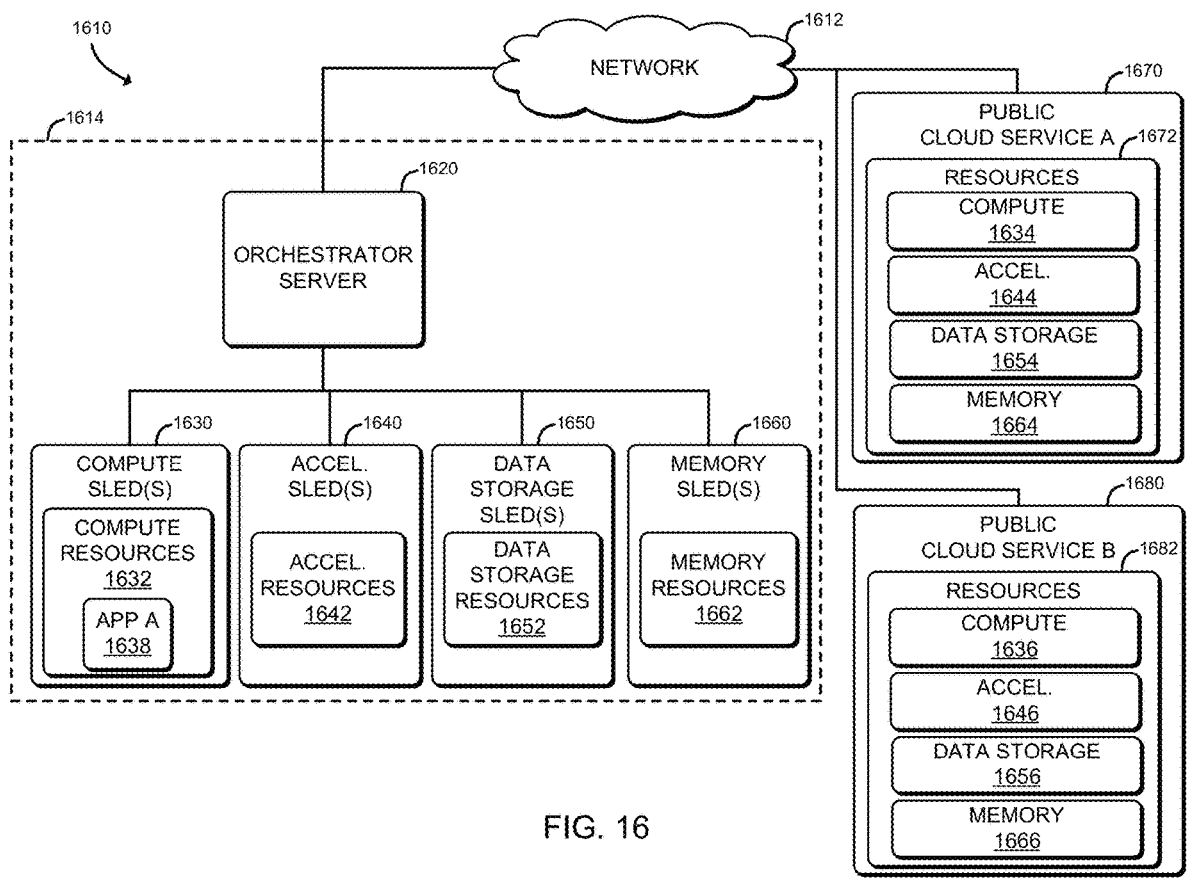
FIG. 16 is a simplified block diagram of at least one embodiment of a system for allocating resources across data centers.

Referring now to FIG. 16, a system 1610 for allocating resources across data centers may be implemented in accordance with the data center 100 described above with reference to FIG. 1. In the illustrative embodiment, the system 1610 includes an orchestrator server 1620 communicatively coupled to multiple sleds including one or more compute sleds 1630, one or more accelerator sleds 1640, one or more data storage sleds 1650, and one or more memory sleds 1660. The compute sled(s) 1630 include compute resources 1632, in operation, execute an application 1638 (e.g., a workload). The accelerator sled(s) 1640 include accelerator resources 1642. Additionally, the data storage sled(s) 1650 include data storage resource 1652, and the memory sled(s) 1660 include memory resources 1662. One or more of the sleds 1630, 1640, 1650, 1660 may be grouped into a managed node, such as by the orchestrator server 1620, to collectively perform a workload (e.g., the application 1638). A managed node may be embodied as an assembly of resources, such as compute resources, memory resources, storage resources, or other resources, from the same or different sleds or racks. Further, a managed node may be established, defined, or "spun up" by the orchestrator server 1620 at the time a workload is to be assigned to the managed node or at any other time, and may exist regardless of whether any workloads are presently assigned to the managed node. The system 1610 may be located in a data center and provide storage and compute services (e.g., cloud services) to a client device (not shown) that is in communication with the system 1610 through a network 1612. The orchestrator server 1620 may support a cloud operating environment, such as OpenStack, and managed nodes established by the orchestrator server 1620 may execute one or more applications or processes (i.e., workloads), such as in virtual machines or containers, on behalf of a user of a client device (not shown).

In the illustrative embodiment, the orchestrator server 1620 determines whether an amount of resources to be used in the execution of an workload (e.g., the application 1638) by a managed node exceeds the amount of resources available in the data center 1614 in which the orchestrator server 1620 and the sleds of the managed node are located and, if so, communicates with one or more other data centers 1670, 1680 (e.g., through the network 1612) that are located off-premises to allocate resources 1672, 1682 to the managed node. The resources 1672 in the data center 1670 include compute resources 1634, similar to the compute resources 1632, accelerator resources 1644, similar to the accelerator resources 1642, data storage resources 1654, similar to the data storage resources 1652, and memory resources 1664, similar to the memory resources 1662. Further, the resources 1682 include compute resources 1636, similar to the compute resources 1632, accelerator resources 1646, similar to the accelerator resources 1642, data storage resources 1656, similar to the data storage resources 1652, and memory resources 1666, similar to the memory resources 1662. In allocating the resources, the orchestrator server 1620 may determine the availability and cost of using the resources at each data center 1670, 1680 and select the resources for use by the managed node as a function of the availability and cost. Further, the orchestrator server 1620 may, in communicating with the data centers 1670, 1680, utilize an application programming interface (API) to format requests and queries pursuant to a format specific to each data center 1670, 1680. Additionally, in the illustrative embodiment, the orchestrator server 1620 obtains address information from the data centers 1670, 1680 that is usable by the managed node to access the resources as if they were local (e.g., in the data center 1614) such as through non-volatile memory express over fabric (NVMe-oF) or other local data bus protocols that are mapped onto a fabric (e.g., a network topology). The orchestrator server 1620 may subsequently deallocate the resources when the resource utilization needs of the managed node decrease (e.g., when the workload enters into a less resource-intensive phase). As such, unlike typical systems in which a managed node is limited to the resources available in a particular data center, the system 1610 enables flexible bursting of the infrastructure (e.g., resources) beyond the particular data center 1614 (e.g., to other data centers) to accommodate the changing resource needs of a workload when the resources are unavailable in the data center 1614.

Figure 17:
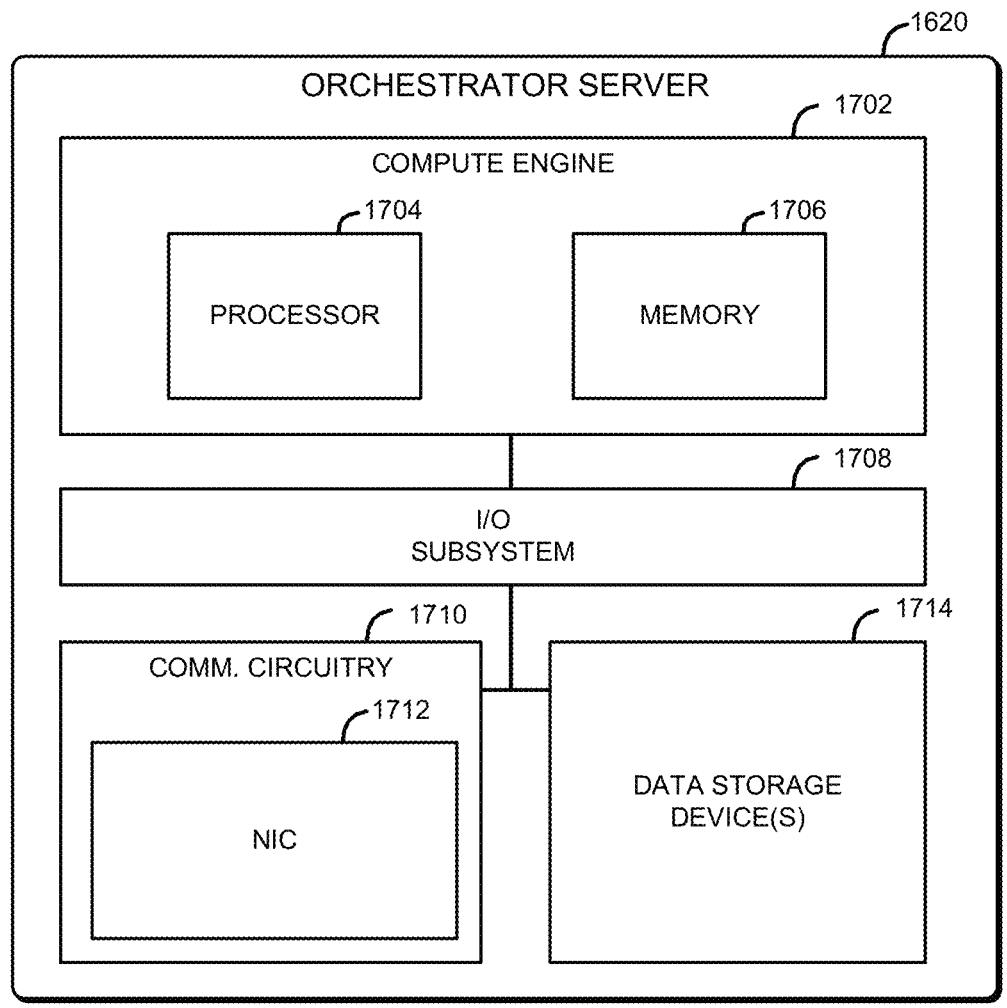
FIG. 17 is a simplified block diagram of at least one embodiment of an orchestrator server of the system of FIG. 16.

Referring now to FIG. 17, the orchestrator server 1620 may be embodied as any type of compute device capable of performing the functions described herein, including obtaining resource utilization data indicative of a utilization of resources for a managed node to execute a workload, determining whether a set of resources presently available to the managed node in a data center in which the orchestrator server 1620 is located satisfies the resource utilization data, and allocating, in response to a determination that the set of resources presently available to the managed node does not satisfy the resource utilization data, a supplemental set of resources to the managed node from an off-premises data center. As shown in FIG. 17, the illustrative orchestrator server 1620 includes a compute engine 1702, an input/output (I/O) subsystem 1708, communication circuitry 1710, and one or more data storage devices 1714. Of course, in other embodiments, the orchestrator server 1620 may include other or additional components, such as those commonly found in a computer (e.g., display, peripheral devices, etc.). Additionally, in some embodiments, one or more of the illustrative components may be incorporated in, or otherwise form a portion of, another component.

The compute engine 1702 may be embodied as any type of device or collection of devices capable of performing various compute functions described below. In some embodiments, the compute engine 1702 may be embodied as a single device such as an integrated circuit, an embedded system, a field-programmable gate array (FPGA), a system-on-a-chip (SOC), or other integrated system or device. In the illustrative embodiment, the compute engine 1702 includes or is embodied as a processor 1704 and a memory 1706. The processor 1704 may be embodied as any type of processor capable of performing the functions described herein. For example, the processor 1704 may be embodied as a single or multi-core processor(s), a microcontroller, or other processor or processing/controlling circuit. In some embodiments, the processor 1704 may be embodied as, include, or be coupled to an FPGA, an application specific integrated circuit (ASIC), reconfigurable hardware or hardware circuitry, or other specialized hardware to facilitate performance of the functions described herein.

The memory 1706 may be embodied as any type of volatile (e.g., dynamic random access memory (DRAM), etc.) or non-volatile memory or data storage capable of performing the functions described herein. Volatile memory may be a storage medium that requires power to maintain the state of data stored by the medium. Non-limiting examples of volatile memory may include various types of random access memory (RAM), such as dynamic random access memory (DRAM) or static random access memory (SRAM). One particular type of DRAM that may be used in a memory module is synchronous dynamic random access memory (SDRAM). In particular embodiments, DRAM of a memory component may comply with a standard promulgated by JEDEC, such as JESD79F for DDR SDRAM, JESD79-2F for DDR2 SDRAM, JESD79-3F for DDR3 SDRAM, JESD79-4A for DDR4 SDRAM, JESD209 for Low Power DDR (LPDDR), JESD209-2 for LPDDR2, JESD209-3 for LPDDR3, and JESD209-4 for LPDDR4 Such standards (and similar standards) may be referred to as DDR-based standards and communication interfaces of the storage devices that implement such standards may be referred to as DDR-based interfaces.

In one embodiment, the memory device is a block addressable memory device, such as those based on NAND or NOR technologies. A memory device may also include future generation nonvolatile devices, such as a three dimensional crosspoint memory device (e.g., Intel 3D XPoint™ memory), or other byte addressable write-in-place nonvolatile memory devices. In one embodiment, the memory device may be or may include memory devices that use chalcogenide glass, multi-threshold level NAND flash memory, NOR flash memory, single or multi-level Phase Change Memory (PCM), a resistive memory, nanowire memory, ferroelectric transistor random access memory (FeTRAM), anti-ferroelectric memory, magnetoresistive random access memory (MRAM) memory that incorporates memristor technology, resistive memory including the metal oxide base, the oxygen vacancy base and the conductive bridge Random Access Memory (CB-RAM), or spin transfer torque (STT)-MRAM, a spintronic magnetic junction memory based device, a magnetic tunneling junction (MTJ)

based device, a DW (Domain Wall) and SOT (Spin Orbit Transfer) based device, a thyristor based memory device, or a combination of any of the above, or other memory. The memory device may refer to the die itself and/or to a packaged memory product.

In some embodiments, 3D crosspoint memory (e.g., Intel 3D XPoint™ memory) may comprise a transistor-less stackable cross point architecture in which memory cells sit at the intersection of word lines and bit lines and are individually addressable and in which bit storage is based on a change in bulk resistance. In some embodiments, all or a portion of the memory 1706 may be integrated into the processor 1704. In operation, the memory 1706 may store various software and data used during operation such as resource utilization data, resource availability data, application programming interface (API) data, applications, programs, and libraries.

The compute engine 1702 is communicatively coupled to other components of the sled 1630 via the I/O subsystem 1708, which may be embodied as circuitry and/or components to facilitate input/output operations with the compute engine 1702 (e.g., with the processor 1704 and/or the memory 1706) and other components of the orchestrator server 1620. For example, the I/O subsystem 1708 may be embodied as, or otherwise include, memory controller hubs, input/output control hubs, integrated sensor hubs, firmware devices, communication links (e.g., point-to-point links, bus links, wires, cables, light guides, printed circuit board traces, etc.), and/or other components and subsystems to facilitate the input/output operations. In some embodiments, the I/O subsystem 1708 may form a portion of a system-on-a-chip (SoC) and be incorporated, along with one or more of the processor 1704, the memory 1706, and other components of the orchestrator server 1620, into the compute engine 1702.

The communication circuitry 1710 may be embodied as any communication circuit, device, or collection thereof, capable of enabling communications over the network 1612 between the orchestrator server 1620 and another compute device (e.g., the sleds 1630, 1640, 1650, 1660, and/or compute devices of the other data centers 1670, 1680, etc.). The communication circuitry 1710 may be configured to use any one or more communication technology (e.g., wired or wireless communications) and associated protocols (e.g., Ethernet, Bluetooth®, Wi-Fi®, WiMAX, etc.) to effect such communication.

The communication circuitry 1710 may include a network interface controller (NIC) 1712 (e.g., as an add-in device), which may also be referred to as a host fabric interface (HFI). The NIC 1712 may be embodied as one or more add-in-boards, daughter cards, network interface cards, controller chips, chipsets, or other devices that may be used by the orchestrator server 1620 to connect with another compute device (e.g., the sleds 1630, 1640, 1650, 1660, and/or compute devices of the other data centers 1670, 1680, etc.). In some embodiments, the NIC 1712 may be embodied as part of a system-on-a-chip (SoC) that includes one or more processors, or included on a multichip package that also contains one or more processors. In some embodiments, the NIC 1712 may include a local processor (not shown) and/or a local memory (not shown) that are both local to the NIC 1712. In such embodiments, the local processor of the NIC 1712 may be capable of performing one or more of the functions of the compute engine 1702 described herein. Additionally or alternatively, in such embodiments, the local memory of the NIC 1712 may be integrated into one or more components of the orchestrator server 1620 at the board level, socket level, chip level, and/or other levels.

The one or more illustrative data storage devices 1714 may be embodied as any type of devices configured for short-term or long-term storage of data such as, for example, memory devices and circuits, memory cards, hard disk drives, solid-state drives, or other data storage devices. Each data storage device 1714 may include a system partition that stores data and firmware code for the data storage device 1714. Each data storage device 1714 may also include one or more operating system partitions that store data files and executables for operating systems.

The sleds 1630, 1640, 1650, 1660 may have components similar to those described in FIG. 17. The description of those components of the orchestrator server 1620 is equally applicable to the description of components of those devices and is not repeated herein for clarity of the description. Further, it should be appreciated that any of the orchestrator server 1620, and the sleds 1630, 1640, 1650, 1660 may include other components, sub-components, and devices commonly found in a computing device, which are not discussed above in reference to the orchestrator server 1620 and not discussed herein for clarity of the description.

As described above, the orchestrator server 1620, the sleds 1630, 1640, 1650, 1660 and the data centers 1670, 1680 are illustratively in communication via the network 1612, which may be embodied as any type of wired or wireless communication network, including global networks (e.g., the Internet), local area networks (LANs) or wide area networks (WANs), cellular networks (e.g., Global System for Mobile Communications (GSM), 3G, Long Term Evolution (LTE), Worldwide Interoperability for Microwave Access (WiMAX), etc.), digital subscriber line (DSL) networks, cable networks (e.g., coaxial networks, fiber networks, etc.), or any combination thereof.

Figure 18:
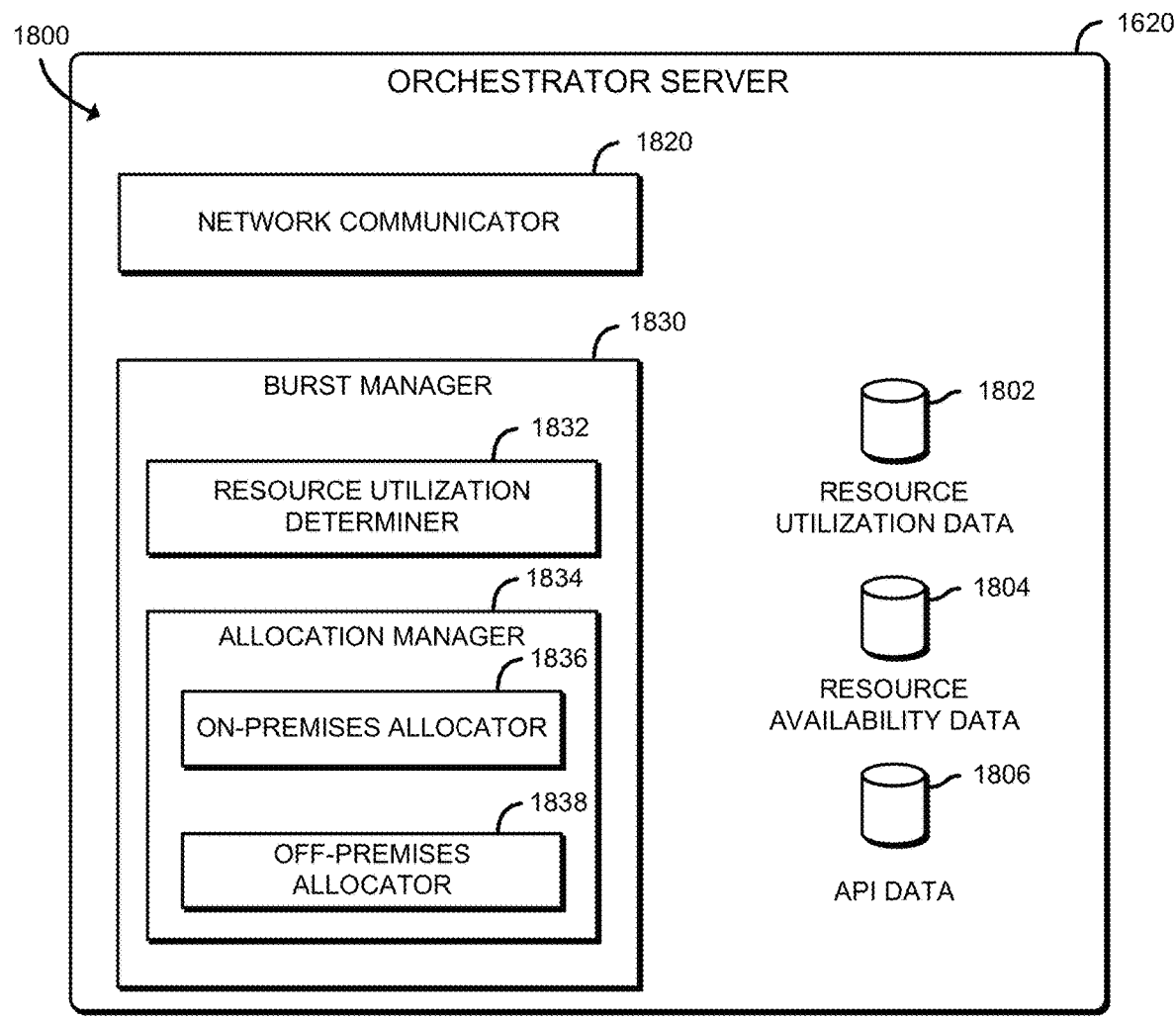
FIG. 18 is a simplified block diagram of at least one embodiment of an environment that may be established by the orchestrator server of FIGS. 16 and 17.

Referring now to FIG. 18, the orchestrator server 1620 may establish an environment 1800 during operation. The illustrative environment 1800 includes a network communicator 1820 and a burst manager 1830. Each of the components of the environment 1800 may be embodied as hardware, firmware, software, or a combination thereof. As such, in some embodiments, one or more of the components of the environment 1800 may be embodied as circuitry or a collection of electrical devices (e.g., network communicator circuitry 1820, burst manager circuitry 1830, etc.). It should be appreciated that, in such embodiments, one or more of the network communicator circuitry 1820 or burst manager circuitry 1830 may form a portion of one or more of the compute engine 1702, the I/O subsystem 1708, the communication circuitry 1710 and/or other components of the orchestrator server 1620. In the illustrative embodiment, the environment 1800 includes resource utilization data 1802 which may be embodied as any data indicative of present and/or predicted amounts and types (e.g., compute, accelerator, data storage, memory) of resources to be utilized by a managed node to execute a workload (e.g., the application 1638). As such, the resource utilization data 1802 may include telemetry data indicative of performance conditions in each sled 1630, 1640, 1650, 1660 in the managed node associated with the workload, such as the present load on each resource of each sled (e.g., the percentage of the resource presently utilized by the workload), fingerprint data indicative of resource utilization profiles of different phases of operation of a workload (e.g., phase A characterized by relatively high compute usage and relative low memory usage, followed by phase B characterized by relatively high accelerator usage, relatively high memory usage, and relatively low data storage usage, etc.) and the lengths of time (e.g., residencies) that each phase typically lasts. Additionally, the resource utilization data 1802 may include target thresholds to which the measured resource utilizations (e.g., loads) are to be compared to and/or target throughput and/or latency (e.g., quality of service (QoS) metrics), pursuant to a service level agreement (SLA) with a customer for whom the workload is executed. The environment 1800, in the illustrative embodiment, also includes resource availability data 1804 which may be embodied as any data indicative of the availability of resources 1672, 1682 at the off-premises data centers 1670, 1680 and the costs of using them (e.g., dollars per unit of compute capacity per second, dollars for gigabyte of storage per second, costs of utilizing a network to access the resources 1672, 1682, etc.). The resource availability data 1804, in the illustrative embodiment, also includes data indicative of the amount and types of presently unallocated resources in the data center 1614 (e.g., on-premises). Additionally, the illustrative environment 1800 includes application programming interface (API) data 1806, which may be embodied as any data indicative of instructions usable to format requests and queries and otherwise communicate with each data center 1670, 1680. In some embodiments, each data center 1670, 1680 may communicate using a different protocol, and as such, the API data 1806 may include libraries or other instructions unique to each data center 1670, 1680.

In the illustrative environment 1800, the network communicator 1820, which may be embodied as hardware, firmware, software, virtualized hardware, emulated architecture, and/or a combination thereof as discussed above, is configured to facilitate inbound and outbound network communications (e.g., network traffic, network packets, network flows, etc.) to and from the orchestrator server 1620, respectively. To do so, the network communicator 1820 is configured to receive and process data packets from one system or computing device (e.g., one or more of the sleds 1630, 1640, 1650, 1660) and to prepare and send data packets to another computing device or system (e.g., resources of one or more of the data centers 1670, 1680). Accordingly, in some embodiments, at least a portion of the functionality of the network communicator 1820 may be performed by the communication circuitry 1710, and, in the illustrative embodiment, by the NIC 1712.

The burst manager 1830, which may be embodied as hardware, firmware, software, virtualized hardware, emulated architecture, and/or a combination thereof, is configured to obtain the resource utilization data 1802, determine whether a set of resources presently available to the managed node in the data center 1614 satisfies the resource utilization data 1802, and allocate, in response to a determination that the set of resources presently available to the managed node does not satisfy the resource utilization data, a supplemental set of resources 1672, 1682 to the managed node from an off-premises data center 1670, 1680. To do so, in the illustrative embodiment, the burst manager 1830 includes a resource utilization determiner 1832 and an allocation manager 1834.

The resource utilization determiner 1832, in the illustrative embodiment, is configured to obtain the resource utilization data 1802, such as by collecting telemetry data indicative of the performance conditions of the resources allocated to the managed node executing the workload, determining patterns in the resource utilizations of the workload over time (e.g., fingerprint data), and predicting the upcoming resource utilization of the workload (e.g., within a predefined amount of time) based on the patterns.

The allocation manager 1834, in the illustrative embodiment, is configured to selectively allocate and/or deallocate resources from the managed node as the workload is executed, from the data center 1614 and/or from off-premises data centers 1670, 1680, to satisfy the resource needs of the managed node, as determined by the resource utilization determiner 1832. To do so, in the illustrative embodiment, the allocation manager 1834 includes an on-premises allocator 1836 and an off-premises allocator 1838. The on-premises allocator 1836, in the illustrative embodiment, is configured to allocate resources (e.g., compute resources 1632, accelerator resources 1642, data storage resources 1652, memory resources 1662) that are presently available in the data center 1614 to the managed node, such as by sending notifications of their assignment to the corresponding sleds 1630, 1640, 1650, 1660 on which the resources are located and/or by providing information usable by the compute sled 1630 to access the resources (e.g., address information). The off-premises allocator 1838, in the illustrative embodiment, is configured to communicate with one or more off-premises data centers (e.g., the data centers 1670, 1680) to determine the amounts and types of resources available and selectively allocate or deallocate the resources on an as-needed basis (e.g., when the resources are not available in the data center 1614). In doing so, the off-premises allocator may compare the cost of each resource (e.g., a price charged by the operator of the off-premises data center 1670, 1680) and select the lowest-cost resources for allocation. Additionally, the off-premises allocator 1838 may utilize one or more APIs in the API data 1806 to communicate with the off-premises data centers 1670, 1680.

It should be appreciated that each of the resource utilization determiner 1832, the allocation manager 1834, the on-premises allocator 1836, and the off-premises allocator 1838 may be separately embodied as hardware, firmware, software, virtualized hardware, emulated architecture, and/or a combination thereof. For example, the resource utilization determiner 1832 may be embodied as a hardware component, while the allocation manager 1834, the on-premises allocator 1836, and the off-premises allocator 1838 are embodied as virtualized hardware components or as some other combination of hardware, firmware, software, virtualized hardware, emulated architecture, and/or a combination thereof.

Figure 19:
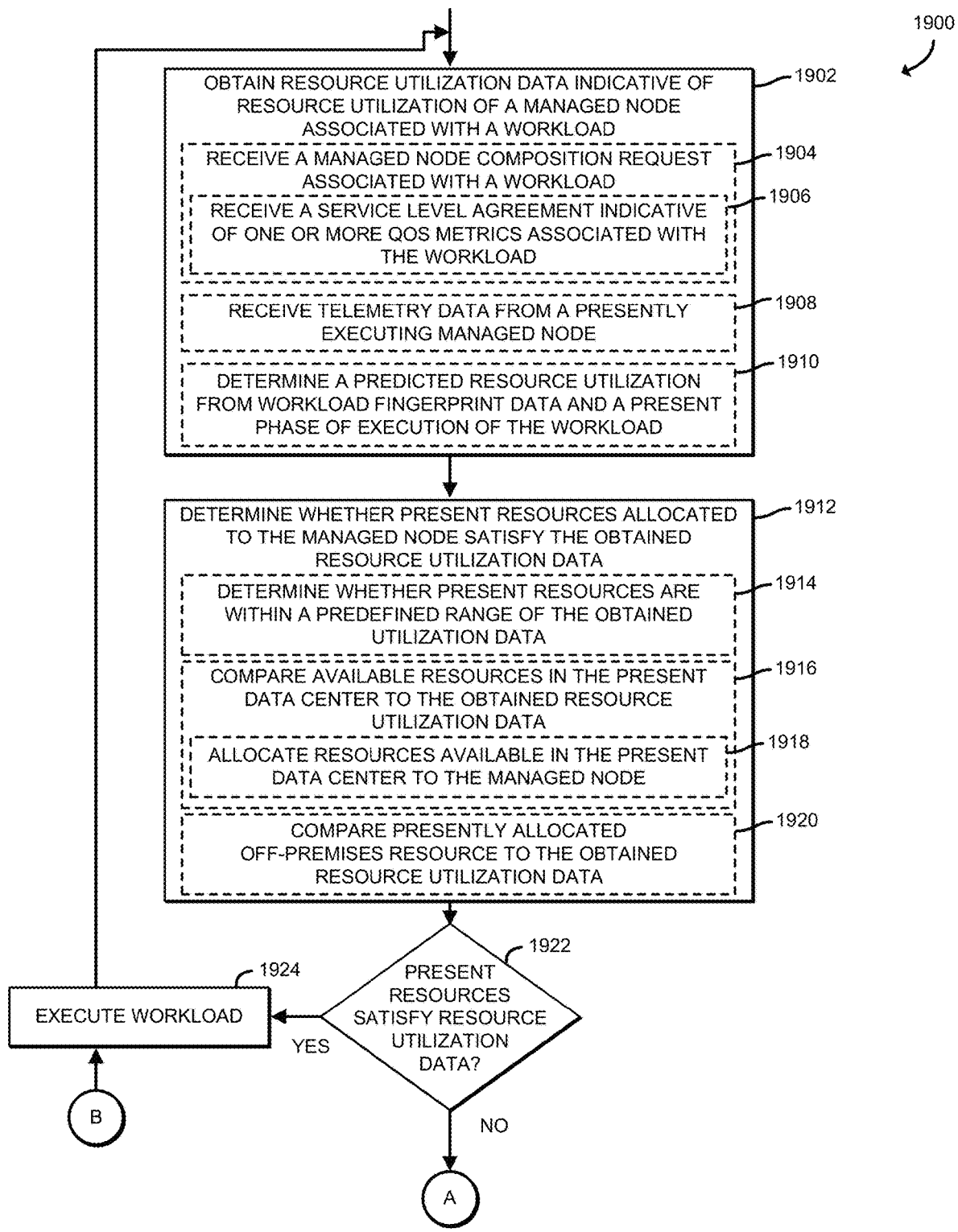
FIGS. 19-21 are a simplified flow diagram of at least one embodiment of a method for allocating resources across data centers that may be performed by the orchestrator server of FIGS. 16 and 17.

Referring now to FIG. 19, the orchestrator server 1620, in operation, may execute a method 1900 for allocating resources across data centers. The method 1900 begins with block 1902 in which the orchestrator server 1620 obtains resource utilization data indicative of resource utilization of a managed node associated with a workload (e.g., a utilization of resources needed to execute the application 1638 at a predefined quality of service). In doing so, the orchestrator server 1620 may receive a managed node composition request associated with a workload (e.g., from a compute sled 1630 that is to execute the application 1638 or from a client device (not shown)), as indicated in block 1904. As indicated in block 1906, the orchestrator server 1620, in receiving the managed node composition request, may receive a service level agreement indicative of one or more quality of service metrics associated with the workload (e.g., a target latency, a target throughput, a target number of input/output operations per second, a target number of instructions executed per second, etc.). Additionally or alternatively, the orchestrator server 1620 may receive telemetry data from a presently-executing managed node (e.g., a managed node presently executing the workload, such as the application 1638), as indicated in block 1908. In the illustrative embodiment, the orchestrator server 1620 determines a predicted resource utilization of the managed node (e.g., the resource utilization predicted in a predefined period of time in the future, such as one second) from workload fingerprint data (e.g., resource utilization phases, patterns of the phases exhibited over time, and the residencies of the phases), as indicated in block 1910.

Subsequently, in block 1912, the orchestrator server 1620 determines whether resources allocated to the managed node satisfy the obtained resource utilization data. In doing so, and as indicated in block 1914, the orchestrator server 1620 may determine whether the present resources are within a predefined range (e.g., 1%) of the obtained utilization data (e.g., within 1% of the amount of resources that are needed by the managed node or are predicted to be needed by the managed node). The predefined range may be defined in the service level agreement as an acceptable variance in the quality of service or may be defined by another source (e.g., in a configuration file). In the illustrative embodiment, the orchestrator server 1620 compares the available resources in the present data center 1614 to the obtained resource utilization data, as indicated in block 1916. In doing so, the orchestrator server 1620 may allocate resources available in the present data center to the managed node (e.g., if the resource utilization data indicates a shortfall between the amount of resources allocated and the amount needed, and those resources are not presently allocated to any other managed nodes in the data center 1614), as indicated in block 1918. The orchestrator server 1620 may also compare the amounts and types of any off-premises resources (e.g., resources 1672, 1682 located in the data centers 1670, 1680) presently allocated to the managed node to the resource utilization data, as indicated in block 1920. Subsequently, in block 1922, the orchestrator server 1620 determines a course of action to take as a function of whether the present resources (e.g., from the data center 1614 and any off-premises data centers 1670, 1680) allocated to the managed node satisfy (e.g., are within the predefined range of) the resource utilization data. If so, the method 1900 advances to block 1924, in which the orchestrator server 1620 monitors further execution of the workload (e.g., the application 1638) and obtains additional (e.g., subsequent) resource utilization data in block 1902, described above. Otherwise, the method 1900 advances to block 1926 of FIG. 20, in which the orchestrator server 1620 determines whether the presently allocated resources exceed the resource utilization data (e.g., in excess of the predefined range of resources).

Figure 20:
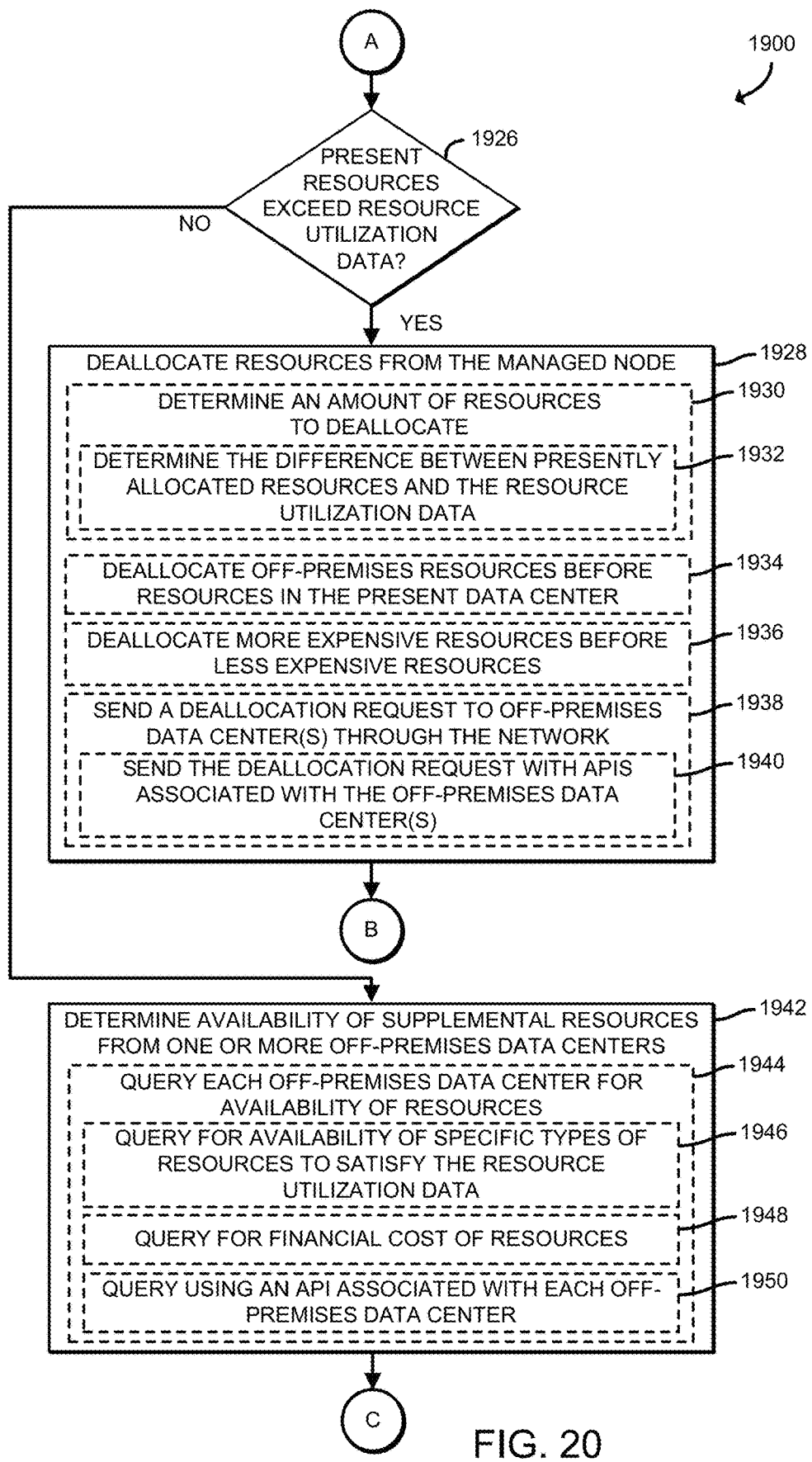

Referring now to FIG. 20, in response to a determination that the present resources allocated to the managed node exceed the resource utilization data, the method 1900 advances to block 1928 in which the orchestrator server 1620 deallocates resources from the managed node. In doing so and as indicated in block 1930, the orchestrator server 1620 determines the amount of resources to deallocate. The orchestrator server 1620, in the illustrative embodiment, does so by determining the difference between the presently allocated resources and the resource utilization data, as indicated in block 1932. As indicated in block 1934, in deallocating the resources, the orchestrator server 1620 may deallocate off-premises resources before deallocating resources in the present data center 1614 (e.g., the data center in which the orchestrator server 1620 is located). In other words, the orchestrator server 1620 prioritizes deallocating off-premises resources over deallocating resources present in the data center 1614. As indicated in block 1936, the orchestrator server 1620 may deallocate more expensive resources before deallocating less expensive resources (e.g., as a function of fees charged by operators of the data centers 1670, 1680 for use of the off-premises resources). In deal-locating the off-premises resources, the orchestrator server 1620, in the illustrative embodiment, sends, through the network 1612, one or more deallocation requests to each off-premises data center 1670, 1680 from which resources are to be deallocated, as indicated in block 1938. As each data center 1670, 1680 may communicate using a different protocol, the orchestrator server 1620 may send the deallocation request(s) using an API associated with each off-premises data center 1670, 1680 (e.g., the API data 1806), as indicated in block 1940. Subsequently, the method 1900 loops back to block 1924 of FIG. 19, in which execution of the workload continues.

Referring back to block 1926 of FIG. 20, if the orchestrator server 1620 instead determines that the present resources do not exceed the resource utilization data 1802 (e.g., the present resources are less than the resource utilization data 1802), the method 1900 advances to block 1942 in which the orchestrator server 1620 determines the availability of supplemental resources from one or more off-premises data centers (e.g., the resources 1672, 1682 at data centers 1670, 1680). In doing so, the orchestrator server 1620 may query each off-premises data center 1670, 1680 for the availability of resources at those data centers 1670, 1680, as indicated in block 1944. In the illustrative embodiment, the orchestrator server 1620 may query for the availability of specific types of resources to satisfy the resource utilization data 1802 (e.g., if the resource utilization data 1802 indicates a deficiency in available accelerator resources, the query may request information indicative of the availability of accelerator resources at the corresponding data center 1670, 1680), as indicated in block 1946. As indicated in block 1948, the orchestrator server 1620 may additionally query for the financial cost of each resource available at the off-premises data center 1670, 1680 (e.g., a financial cost per unit of time on a specific FPGA, a financial cost per number of gigabytes allocated from a particular type of data storage device, etc.). Further, as indicated in block 1950, the orchestrator server 1620 may send the queries using an API associated with each off-premises data center 1670, 1680. Subsequently, the method 1900 advances to block 1952 of FIG. 21, in which the orchestrator server 1620 selects one or more of the off-premises data centers 1670, 1680 from which to allocate the supplemental resources.

Figure 21:
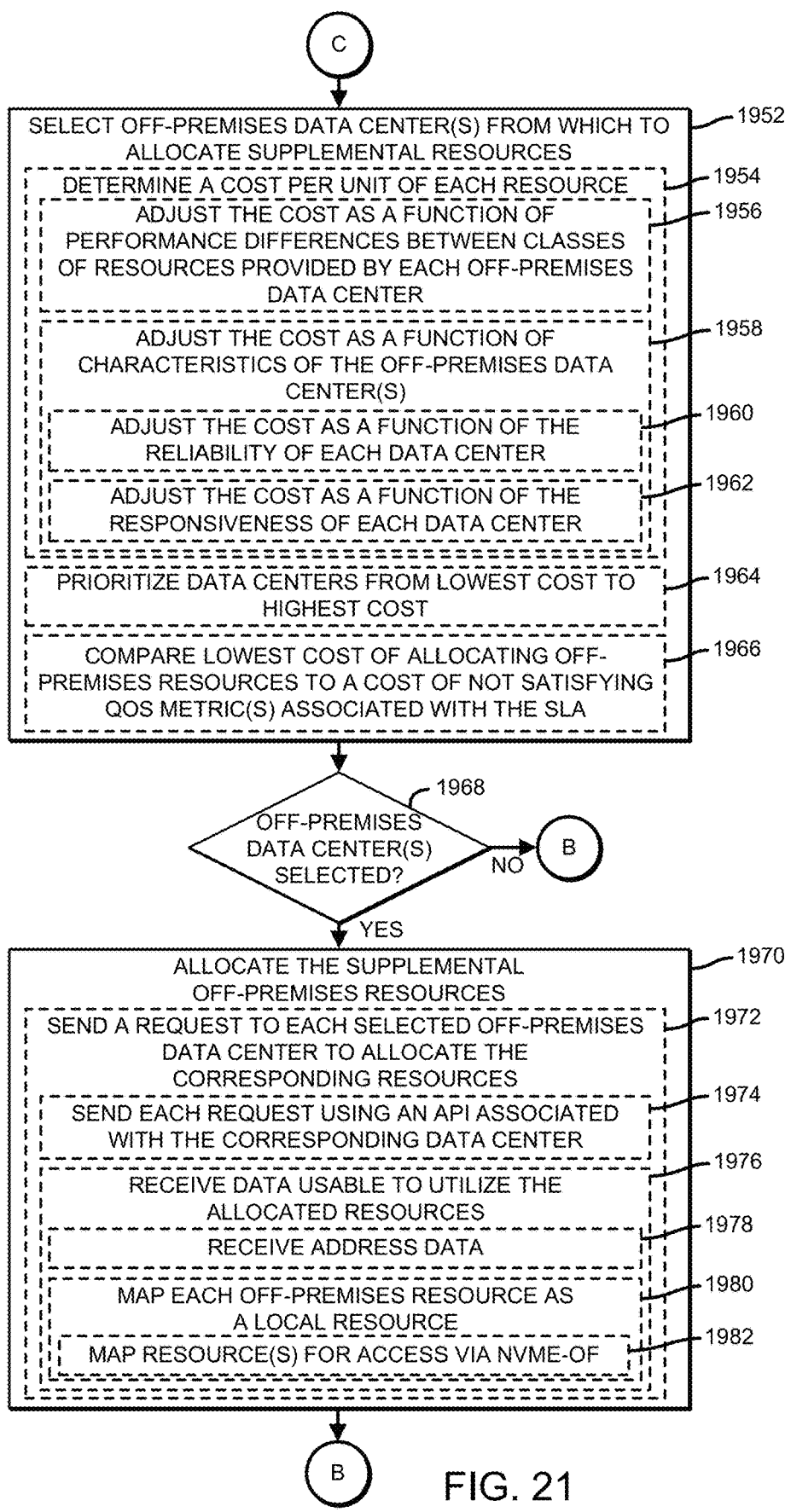

Referring now to FIG. 21, in selecting one or more off-premises data centers 1670, 1680, the orchestrator server 1620 may determine a cost per unit of each resource 1672, 1682, as indicated in block 1954. For example, the orchestrator server 1620 may determine that one class of accelerator resource available at the data center 1670 performs a greater number of operations per second than another class of accelerator resource available at the data center 1680. Similarly, one class of memory or data storage device available at the data center 1670 may provide a greater read and/or write throughput than another class of memory or data storage device available at the data center 1680. As such, and as indicated in block 1956, the orchestrator server 1620, in the illustrative embodiment, adjusts the costs (e.g., from block 1948 of FIG. 20) as a function of performance differences between classes of resources provided by each off-premises data center 1670, 1680. For example, the orchestrator server 1620 may determine a unit by which to measure each class of resource (e.g., operations per second), determine the amount of the units provided by each class of resources, and divide the cost associated with the resource by the amount of the units provided the resource (e.g., cents per operation per second). Additionally, the orchestrator server 1620 may adjust the cost as a function of characteristics of each off-premises data center 1670, 1680, as indicated in block 1958. In doing so, the orchestrator server 1620 may adjust the cost as a function of the reliability of each data center 1670, 1680 (e.g., decreasing the cost for a more reliable data center and increasing the cost for a less reliable data center), as indicated in block 1960. As indicated in block 1962, the orchestrator server 1620 may adjust the cost as a function of the responsiveness of each data center 1670, 1680 (e.g., decreasing the cost for a data center that generally has a lower latency and increasing the cost for a data center that generally has a higher latency). In block 1964, the orchestrator server 1620 may prioritize (e.g., rank for selection) the data centers 1670, 1680 in order from lowest cost to highest cost. The orchestrator server 1620 may also compare the lowest available cost of allocating off-premises resources 1672, 1682 (e.g., in accordance with the prioritization from block 1964) to a cost of not satisfying quality of service metrics associated with the workload (e.g., as specified in a service level agreement for the workload) and determine whether the cost of allocating the off-premises resources is less than or equal to the cost of not satisfying the QoS metric(s), as indicated in block 1966. In the illustrative embodiment, if the cost of allocating the off-premises resources is less than or equal to the cost of not satisfying the QoS metric(s), the orchestrator server 1620 selects one or more of the off-premises data centers 1670, 1680 for allocation of off-premises (e.g., supplemental) resources.

In block 1968, the orchestrator server 1620 determines the subsequent course of action as a function of whether one or more off-premises data centers 1670, 1680 have been selected. If not, the method 1900 loops back to block 1924 of FIG. 19, in which the managed node continues execution of the workload. Otherwise, the method 1900 advances to block 1970, in which the orchestrator server 1620 allocates the supplemental off-premises resource(s) to the managed node associated with the workload (e.g., the application 1638). In doing so, the orchestrator server 1620 may send a request to each selected off-premises data center to allocate the corresponding resource(s), as indicated in block 1972. The orchestrator server 1620 may send each request using an API associated with the corresponding data center 1670, 1680, as indicated in block 1974. Further, and as indicated in block 1976, the orchestrator server 1620 receives data usable to utilize the allocated resource(s). In doing so, the orchestrator server 1620 may receive address data (e.g., a unique identifier such as an Internet Protocol (IP) address, a media access control (MAC) address, etc.) for each resource, as indicated in block 1978. Further, in the illustrative embodiment, the orchestrator server 1620 maps each off-premises resource as a local resource (e.g., to appear to sleds of the managed node in the data center 1614 as if those off-premises resources 1672, 1682 are also located in the data center 1614), as indicated in block 1980. For example, and as indicated in block 1982, the orchestrator server 1620 may map one or more resource(s) for access via non-volatile memory express over fabric (NVMe-oF). Subsequently, the method 1900 loops back to block 1924 of FIG. 19 in which execution of the workload continues.

EXAMPLES

Illustrative examples of the technologies disclosed herein are provided below. An embodiment of the technologies may include any one or more, and any combination of, the examples described below.

Example 1 includes a compute device comprising a compute engine to (i) obtain resource utilization data indicative of a utilization of resources for a managed node to execute a workload, (ii) determine whether a set of resources presently available to the managed node in a data center in which the compute device is located satisfies the resource utilization data, and (iii) allocate, in response to a determination that the set of resources presently available to the managed node does not satisfy the resource utilization data, a supplemental set of resources to the managed node, wherein the supplemental set of resources are located in an off-premises data center that is different from the data center in which the compute device is located.

Example 2 includes the subject matter of Example 1, and wherein to allocate the supplemental set of resources comprises to map the supplemental set of resources to be accessible as being located in the data center in which the compute device is located.

Example 3 includes the subject matter of any of Examples 1 and 2, and wherein the compute engine is further to determine an availability of the supplemental set of resources prior to the allocation of the supplemental set of resources.

Example 4 includes the subject matter of any of Examples 1-3, and wherein to determine the availability of the supplemental set of resources comprises to query the off-premises data center for an availability of the supplemental set of resources.

Example 5 includes the subject matter of any of Examples 1-4, and wherein to query the off-premises data center comprises to query the off-premises data center with an application programming interface associated with the off-premises data center.

Example 6 includes the subject matter of any of Examples 1-5, and wherein to determine the availability of the supplemental set of resources comprises to query the off-premises data center for a cost of the supplemental set of resources.

Example 7 includes the subject matter of any of Examples 1-6, and wherein the off-premises data center is one of a plurality of off-premises data centers, and the compute engine is further to select the off-premises data center for allocation of the supplemental set of resources as a function of the determined availability and cost of the supplemental set of resources.

Example 8 includes the subject matter of any of Examples 1-7, and wherein the compute engine is further to deallocate, in response to a determination that the set of resources presently allocated to the managed node exceeds the resource utilization data, one or more of the resources from the managed node.

Example 9 includes the subject matter of any of Examples 1-8, and wherein to deallocate the one or more of the resources comprises to prioritize deallocation of resources located in the off-premises data center over deallocation of resources located in the data center in which the compute device is located.

Example 10 includes the subject matter of any of Examples 1-9, and wherein to deallocate the one or more of the resources comprises to prioritize deallocations of resources as a function of a cost of each resource.

Example 11 includes the subject matter of any of Examples 1-10, and wherein the compute engine is further to determine whether a cost of not satisfying a service level agreement associated with the workload exceeds a cost of allocating the supplemental set of resources; and to allocate the supplemental set of resources comprises to allocate, in response to a determination that that the cost of not satisfying the service level agreement exceeds the cost of allocating the supplemental set of resources, the supplemental set of resources.

Example 12 includes the subject matter of any of Examples 1-11, and wherein to allocate the supplemental set of resources comprises to allocate at least one of accelerator resources, data storage resources, compute resources, or memory resources.

Example 13 includes a method comprising obtaining, by a compute device, resource utilization data indicative of a utilization of resources for a managed node to execute a workload; determining, by the compute device, whether a set of resources presently available to the managed node in a data center in which the compute device is located satisfies the resource utilization data; allocating, by the compute device and in response to a determination that the set of resources presently available to the managed node does not satisfy the resource utilization data, a supplemental set of resources to the managed node, wherein the supplemental set of resources are located in an off-premises data center that is different from the data center in which the compute device is located.

Example 14 includes the subject matter of Example 13, and wherein allocating the supplemental set of resources comprises mapping the supplemental set of resources to be accessible as being located in the data center in which the compute device is located.

Example 15 includes the subject matter of any of Examples 13 and 14, and further including determining, by the compute device, an availability of the supplemental set of resources prior to the allocation of the supplemental set of resources.

Example 16 includes the subject matter of any of Examples 13-15, and wherein determining the availability of the supplemental set of resources comprises querying the off-premises data center for an availability of the supplemental set of resources.

Example 17 includes the subject matter of any of Examples 13-16, and wherein querying the off-premises data center comprises querying the off-premises data center with an application programming interface associated with the off-premises data center.

Example 18 includes the subject matter of any of Examples 13-17, and wherein determining the availability of the supplemental set of resources comprises querying the off-premises data center for a cost of the supplemental set of resources.

Example 19 includes the subject matter of any of Examples 13-18, and wherein the off-premises data center is one of a plurality of off-premises data centers, the method further comprising selecting, by the compute device, the off-premises data center for allocation of the supplemental set of resources as a function of the determined availability and cost of the supplemental set of resources.

Example 20 includes the subject matter of any of Examples 13-19, and further including deallocating, by the compute device and in response to a determination that the set of resources presently allocated to the managed node exceeds the resource utilization data, one or more of the resources from the managed node.

Example 21 includes the subject matter of any of Examples 13-20, and wherein deallocating the one or more of the resources comprises prioritizing deallocation of resources located in the off-premises data center over deallocation of resources located in the data center in which the compute device is located.

Example 22 includes the subject matter of any of Examples 13-21, and wherein deallocating the one or more of the resources comprises prioritizing deallocations of resources as a function of a cost of each resource.

Example 23 includes the subject matter of any of Examples 13-22, and further including determining, by the compute device, whether a cost of not satisfying a service level agreement associated with the workload exceeds a cost of allocating the supplemental set of resources; and allocating the supplemental set of resources comprises allocating, in response to a determination that that the cost of not satisfying the service level agreement exceeds the cost of allocating the supplemental set of resources, the supplemental set of resources.

Example 24 includes the subject matter of any of Examples 13-23, and wherein allocating the supplemental set of resources comprises allocating at least one of accelerator resources, data storage resources, compute resources, or memory resources.

Example 25 includes a compute device comprising means for performing the method of any of Examples 13-24.

Example 26 includes one or more machine-readable storage media comprising a plurality of instructions stored thereon that, in response to being executed, cause a compute engine to perform the method of any of Examples 13-24.

Example 27 includes a compute device comprising a compute engine to perform the method of any of Examples 13-24.

Example 28 includes a compute device comprising burst manager circuitry to (i) obtain resource utilization data indicative of a utilization of resources for a managed node to execute a workload, (ii) determine whether a set of resources presently available to the managed node in a data center in which the compute device is located satisfies the resource utilization data, and (iii) allocate, in response to a determination that the set of resources presently available to the managed node does not satisfy the resource utilization data, a supplemental set of resources to the managed node, wherein the supplemental set of resources are located in an off-premises data center that is different from the data center in which the compute device is located.

Example 29 includes the subject matter of Example 28, and wherein to allocate the supplemental set of resources comprises to map the supplemental set of resources to be accessible as being located in the data center in which the compute device is located.

Example 30 includes the subject matter of any of Examples 28 and 29, and wherein the burst manager circuitry is further to determine an availability of the supplemental set of resources prior to the allocation of the supplemental set of resources.

Example 31 includes the subject matter of any of Examples 28-30, and wherein to determine the availability of the supplemental set of resources comprises to query the off-premises data center for an availability of the supplemental set of resources.

Example 32 includes the subject matter of any of Examples 28-31, and wherein to query the off-premises data center comprises to query the off-premises data center with an application programming interface associated with the off-premises data center.

Example 33 includes the subject matter of any of Examples 28-32, and wherein to determine the availability of the supplemental set of resources comprises to query the off-premises data center for a cost of the supplemental set of resources.

Example 34 includes the subject matter of any of Examples 28-33, and wherein the off-premises data center is one of a plurality of off-premises data centers, and the burst manager circuitry is further to select the off-premises data center for allocation of the supplemental set of resources as a function of the determined availability and cost of the supplemental set of resources.

Example 35 includes the subject matter of any of Examples 28-34, and wherein the burst manager circuitry is further to deallocate, in response to a determination that the set of resources presently allocated to the managed node exceeds the resource utilization data, one or more of the resources from the managed node.

Example 36 includes the subject matter of any of Examples 28-35, and wherein to deallocate the one or more of the resources comprises to prioritize deallocation of resources located in the off-premises data center over deallocation of resources located in the data center in which the compute device is located.

Example 37 includes the subject matter of any of Examples 28-36, and wherein to deallocate the one or more of the resources comprises to prioritize deallocations of resources as a function of a cost of each resource.

Example 38 includes the subject matter of any of Examples 28-37, and wherein the burst manager circuitry is further to determine whether a cost of not satisfying a service level agreement associated with the workload exceeds a cost of allocating the supplemental set of resources; and to allocate the supplemental set of resources comprises to allocate, in response to a determination that that the cost of not satisfying the service level agreement exceeds the cost of allocating the supplemental set of resources, the supplemental set of resources.

Example 39 includes the subject matter of any of Examples 28-38, and wherein to allocate the supplemental set of resources comprises to allocate at least one of accelerator resources, data storage resources, compute resources, or memory resources.

Example 40 includes a compute device comprising circuitry for obtaining resource utilization data indicative of a utilization of resources for a managed node to execute a workload; circuitry for determining whether a set of resources presently available to the managed node in a data center in which the compute device is located satisfies the resource utilization data; means for allocating, in response to a determination that the set of resources presently available to the managed node does not satisfy the resource utilization data, a supplemental set of resources to the managed node, wherein the supplemental set of resources are located in an off-premises data center that is different from the data center in which the compute device is located.

Example 41 includes the subject matter of Example 40, and wherein the means for allocating the supplemental set of resources comprises means for mapping the supplemental set of resources to be accessible as being located in the data center in which the compute device is located.

Example 42 includes the subject matter of any of Examples 40 and 41, and further including circuitry for determining an availability of the supplemental set of resources prior to the allocation of the supplemental set of resources.

Example 43 includes the subject matter of any of Examples 40-42, and wherein the circuitry for determining the availability of the supplemental set of resources comprises circuitry for querying the off-premises data center for an availability of the supplemental set of resources.

Example 44 includes the subject matter of any of Examples 40-43, and wherein the circuitry for querying the off-premises data center comprises circuitry for querying the off-premises data center with an application programming interface associated with the off-premises data center.

Example 45 includes the subject matter of any of Examples 40-44, and wherein the circuitry for determining the availability of the supplemental set of resources comprises circuitry for querying the off-premises data center for a cost of the supplemental set of resources.

Example 46 includes the subject matter of any of Examples 40-45, and wherein the off-premises data center is one of a plurality of off-premises data centers, and the compute device further comprises means for selecting the off-premises data center for allocation of the supplemental set of resources as a function of the determined availability and cost of the supplemental set of resources.

Example 47 includes the subject matter of any of Examples 40-46, and further including circuitry for deallocating, in response to a determination that the set of resources presently allocated to the managed node exceeds the resource utilization data, one or more of the resources from the managed node.

Example 48 includes the subject matter of any of Examples 40-47, and wherein the circuitry for deallocating the one or more of the resources comprises circuitry for prioritizing deallocation of resources located in the off-premises data center over deallocation of resources located in the data center in which the compute device is located.

Example 49 includes the subject matter of any of Examples 40-48, and wherein the circuitry for deallocating the one or more of the resources comprises circuitry for prioritizing deallocations of resources as a function of a cost of each resource.

Example 50 includes the subject matter of any of Examples 40-49, and further including circuitry for determining whether a cost of not satisfying a service level agreement associated with the workload exceeds a cost of allocating the supplemental set of resources; and wherein the means for allocating the supplemental set of resources comprises means for allocating, in response to a determination that that the cost of not satisfying the service level agreement exceeds the cost of allocating the supplemental set of resources, the supplemental set of resources.

Example 51 includes the subject matter of any of Examples 40-50, and wherein the means for allocating the supplemental set of resources comprises circuitry for allocating at least one of accelerator resources, data storage resources, compute resources, or memory resources.

The invention claimed is:

1. A computing system configurable to be used with local data center resources in association with providing of at least one cloud-based service, the at least one cloud-based service being associated with execution of at least one workload, the local data center resources comprising local physical rack server resources that are to communicate with the computing system via communication links, the computing system comprising:
  other data center resources remote from the local data center resources, the other data center resources being configurable to comprise compute resources, storage resources, and accelerator resources; and
  management resources comprising circuitry, the management resources being configurable for use in allocating and/or deallocating the compute resources, the storage resources, the accelerator resources, and/or the local physical rack server resources for use in the execution of the at least one workload;

wherein:
the at least one workload comprises at least one virtual machine workload and/or at least one container workload;
the compute resources, the storage resources, and the accelerator resources are associated with at least one cloud service provider;
the local physical rack server resources are at one or more premises associated with a customer of the at least one cloud service provider;
the management resources are configurable to dynamically allocate and/or dynamically deallocate, on an as-needed basis, based upon (1) telemetry-based present resource utilization data, (2) future resource utilization prediction data, (3) application programming interface (API) data, (4) resource utilization trend data, and/or (5) quality of service-related data, the compute resources, the storage resources, the accelerator resources, and/or the local physical rack server resources for use in the execution of the at least one workload;
the accelerator resources and the local physical rack server resources are configurable to comprise graphics processing unit circuits for use in the execution, at least in part, of the at least one workload;
the at least one workload is configurable to perform at least one machine learning-related operation;
the management resources are to select, based upon the API data, the compute resources, the storage resources, the accelerator resources, and/or the local physical rack server resources for dynamic allocation and/or dynamic deallocation for use in the execution of the at least one workload; and
the API data is configurable to be communicated to the management resources in accordance with multiple different protocols.

2. The computing system of claim 1, wherein:
the local physical rack server resources are configurable to comprise physical rack server compute resources, physical rack server storage resources, and physical rack server accelerator resources for use in the execution, at least in part, of the at least one workload.

3. The computing system of claim 2, wherein:
the management resources are to communicate, at least in part, via an API.

4. The computing system of claim 3, wherein:
the management resources are configurable to allocate and/or deallocate the compute resources, the storage resources, the accelerator resources, and/or the local physical rack server resources, based upon client request data and resource utilization cost data.

5. The computing system of claim 4, wherein:
the local data center resources and the other data center resources are comprised in different respective data centers.

6. The computing system of claim 5, wherein:
the different respective data centers are to communicate with each other via optical communication links and at least one switch.

7. The computing system of claim 5, wherein:
the management resources are configurable to dynamically allocate and/or dynamically deallocate, on the as-needed basis, based upon (1) the telemetry-based present resource utilization data, (2) the future resource utilization prediction data, (3) the application programming interface (API) data, (4) the resource utilization trend data, and (5) the quality of service-related data, the compute resources, the storage resources, the accelerator resources, and the local physical rack server resources for use in the execution of the at least one workload.

8. At least one non-transitory machine-readable storage medium storing instructions for being executed by at least one machine, the at least one machine to be associated with a computing system, the computing system being configurable to be used with local data center resources in association with providing of at least one cloud-based service, the at least one cloud-based service being associated with execution of at least one workload, the local data center resources comprising local physical rack server resources that are to communicate with the computing system via communication links, the computing system comprising other data center resources remote from the local data center resources, the computing system also comprising management resources that comprise circuitry, the instructions, when executed by the at least one machine, resulting in the computing system being configured for performance of operations comprising:
configuring the other data center resources to comprise compute resources, storage resources, and accelerator resources; and
configuring the management resources for use in allocating and/or deallocating the compute resources, the storage resources, the accelerator resources, and/or the local physical rack server resources for use in the execution of the at least one workload;

wherein:
the at least one workload comprises at least one virtual machine workload and/or at least one container workload;
the compute resources, the storage resources, and the accelerator resources are associated with at least one cloud service provider;
the local physical rack server resources are at one or more premises associated with a customer of the at least one cloud service provider;
the management resources are configurable to dynamically allocate and/or dynamically deallocate, on an as-needed basis, based upon (1) telemetry-based present resource utilization data, (2) future resource utilization prediction data, (3) application programming interface (API) data, (4) resource utilization trend data, and (5) quality of service-related data, the compute resources, the storage resources, the accelerator resources, and/or the local physical rack server resources for use in the execution of the at least one workload;
the accelerator resources and the local physical rack server resources are configurable to comprise graphics processing unit circuits for use in the execution, at least in part, of the at least one workload;
the at least one workload is configurable to perform at least one machine learning-related operation;
the management resources are to select, based upon the API data, the compute resources, the storage resources, the accelerator resources, and/or the local physical rack server resources for dynamic allocation and/or dynamic deallocation for use in the execution of the at least one workload;
the API data is configurable to be communicated to the management resources in accordance with multiple different protocols.

9. The at least one non-transitory machine-readable storage medium of claim 8, wherein:
the local physical rack server resources are configurable to comprise physical rack server compute resources, physical rack server storage resources, and physical rack server accelerator resources for use in the execution, at least in part, of the at least one workload.

10. The at least one non-transitory machine-readable storage medium of claim 9, wherein:
the management resources are to communicate, at least in part, via an API.

11. The at least one non-transitory machine-readable storage medium of claim 10, wherein:
the management resources are configurable to allocate and/or deallocate the compute resources, the storage resources, the accelerator resources, and/or the local physical rack server resources, based upon client request data and resource utilization cost data.

12. The at least one non-transitory machine-readable storage medium of claim 11, wherein:
the local data center resources and the other data center resources are comprised in different respective data centers.

13. The at least one non-transitory machine-readable storage medium of claim 12, wherein:
the different respective data centers are to communicate with each other via optical communication links and at least one switch.

14. The at least one non-transitory machine-readable storage medium of claim 12, wherein:
the management resources are configurable to dynamically allocate and/or dynamically deallocate, on the as-needed basis, based upon (1) the telemetry-based present resource utilization data, (2) the future resource utilization prediction data, (3) the application programming interface (API) data, (4) the resource utilization trend data, and (5) the quality of service-related data, the compute resources, the storage resources, the accelerator resources, and the local physical rack server resources for use in the execution of the at least one workload.

15. A method implemented using a computing system, the computing system being configurable to be used with local data center resources in association with providing of at least one cloud-based service, the at least one cloud-based service being associated with execution of at least one workload, the local data center resources comprising local physical rack server resources that are to communicate with the computing system via communication links, the computing system comprising other data center resources remote from the local data center resources, the computing system also comprising management resources that comprise circuitry, the method comprising:
configuring the other data center resources to comprise compute resources, storage resources, and accelerator resources; and
configuring the management resources for use in allocating and/or deallocating the compute resources, the storage resources, the accelerator resources, and/or the local physical rack server resources for use in the execution of the at least one workload;
wherein:
the at least one workload comprises at least one virtual machine workload and/or at least one container workload;
the compute resources, the storage resources, and the accelerator resources are associated with at least one cloud service provider;
the local physical rack server resources are at one or more premises associated with a customer of the at least one cloud service provider;
the management resources are configurable to dynamically allocate and/or dynamically deallocate, on an as-needed basis, based upon (1) telemetry-based present resource utilization data, (2) future resource utilization prediction data, (3) application programming interface (API) data, (4) resource utilization trend data, and (5) quality of service-related data, the compute resources, the storage resources, the accelerator resources, and/or the local physical rack server resources for use in the execution of the at least one workload;
the accelerator resources and the local physical rack server resources are configurable to comprise graphics processing unit circuits for use in the execution, at least in part, of the at least one workload;
the at least one workload is configurable to perform at least one machine learning-related operation;
the management resources are to select, based upon the API data, the compute resources, the storage resources, the accelerator resources, and/or the local physical rack server resources for dynamic allocation and/or dynamic deallocation for use in the execution of the at least one workload; and
the API data is configurable to be communicated to the management resources in accordance with multiple different protocols.

16. The method of claim 15, wherein:
the local physical rack server resources are configurable to comprise physical rack server compute resources, physical rack server storage resources, and physical rack server accelerator resources for use in the execution, at least in part, of the at least one workload.

17. The method of claim 16, wherein:
the management resources are to communicate, at least in part, via an API.

18. The method of claim 17, wherein:
the management resources are configurable to allocate and/or deallocate the compute resources, the storage resources, the accelerator resources, and/or the local physical rack server resources, based upon client request data and resource utilization cost data.

19. The method of claim 18, wherein:
the local data center resources and the other data center resources are comprised in different respective data centers.

20. The method of claim 19, wherein:
the different respective data centers are to communicate with each other via optical communication links and at least one switch.

21. The method of claim 19, wherein:
the management resources are configurable to dynamically allocate and/or dynamically deallocate, on the as-needed basis, based upon (1) the telemetry-based present resource utilization data, (2) the future resource utilization prediction data, (3) the application programming interface (API) data, (4) the resource utilization trend data, and (5) the quality of service-related data, the compute resources, the storage resources, the accelerator resources, and the local physical rack server resources for use in the execution of the at least one workload.

* * * * *